US011237076B2

(12) United States Patent
Mazrooee et al.

(10) Patent No.: US 11,237,076 B2
(45) Date of Patent: Feb. 1, 2022

(54) AUTOMATIC PRESSURE TESTING FOR LEAKS IN FRAC IRON

(71) Applicant: Halliburton Energy Services, Inc., Houston, TX (US)

(72) Inventors: Mehdi Sebdani Mazrooee, Double Oak, TX (US); Michael Linley Fripp, Carrollton, TX (US); Ian Bradford Mitchell, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 204 days.

(21) Appl. No.: 16/550,696

(22) Filed: Aug. 26, 2019

(65) Prior Publication Data
US 2021/0063271 A1    Mar. 4, 2021

(51) Int. Cl.
*G01M 3/28* (2006.01)
*E21B 43/26* (2006.01)
*F15B 19/00* (2006.01)

(52) U.S. Cl.
CPC .......... *G01M 3/2815* (2013.01); *E21B 43/26* (2013.01); *F15B 19/005* (2013.01)

(58) Field of Classification Search
CPC .. G01M 3/00; G01M 3/26–28; G01M 3/2815; E21B 43/26; F15B 19/00; F15B 19/005
See application file for complete search history.

(56) References Cited

U.S. PATENT DOCUMENTS

| 10,768,642 | B2* | 9/2020 | Bishop | G05D 16/2073 |
| 2013/0226475 | A1* | 8/2013 | Franklin | G01M 3/2815 |
| | | | | 702/51 |
| 2016/0265330 | A1 | 9/2016 | Mazrooee et al. | |
| 2016/0313208 | A1* | 10/2016 | Hilpert | G01M 3/2876 |
| 2017/0074748 | A1* | 3/2017 | Hilpert | G01M 3/2876 |
| 2017/0254719 | A1* | 9/2017 | Franklin | G01M 3/26 |
| 2020/0256757 | A1* | 8/2020 | Sixsmith | G01M 3/243 |
| 2020/0400003 | A1* | 12/2020 | Webster | E21B 43/26 |

OTHER PUBLICATIONS

Wachel, et al., "Analysis of Vibration and Failure Problems in Reciprocating Triplex Pumps for Oil Pipelines", The American Society of Mechanical Engineers, Energy-Sources and Technology Conference and Exhibition, Feb. 1985, 8 pages.

* cited by examiner

*Primary Examiner* — Nguyen Q. Ha
(74) *Attorney, Agent, or Firm* — Gilliam IP PLLC

(57) ABSTRACT

Automatically pressure testing a frac iron configuration in a wellbore environment including performing a plurality of pressure testing cycles using increasing higher levels of fluid pressure to detect the presence of any leaks in the frac iron at one or more of the pressurization levels.

21 Claims, 7 Drawing Sheets

US 11,237,076 B2

AUTOMATIC PRESSURE TESTING FOR LEAKS IN FRAC IRON

TECHNICAL FIELD

The present disclosure relates generally to oilfield drilling and production.

BACKGROUND

Well stimulation is utilized by the oil and gas industry to increase the transfer of hydrocarbon resources from a reservoir formation to a wellbore. Such stimulation typically relies on the introduction of a pressurized fracturing fluid into a wellbore. The pressurized fracturing fluid generates fractures downhole in the reservoir formation. As part of the process, a flow network, sometimes referred to as "frac iron," is constructed between a plurality of pumps and a wellhead of a borehole to provide a path to deliver the pressurized fracturing fluid to the borehole used to generate fractures downhole and to stabilize the fractures.

BRIEF DESCRIPTION OF THE DRAWINGS

Embodiments of the disclosure may be better understood by referencing the accompanying drawings.

Figure 1:
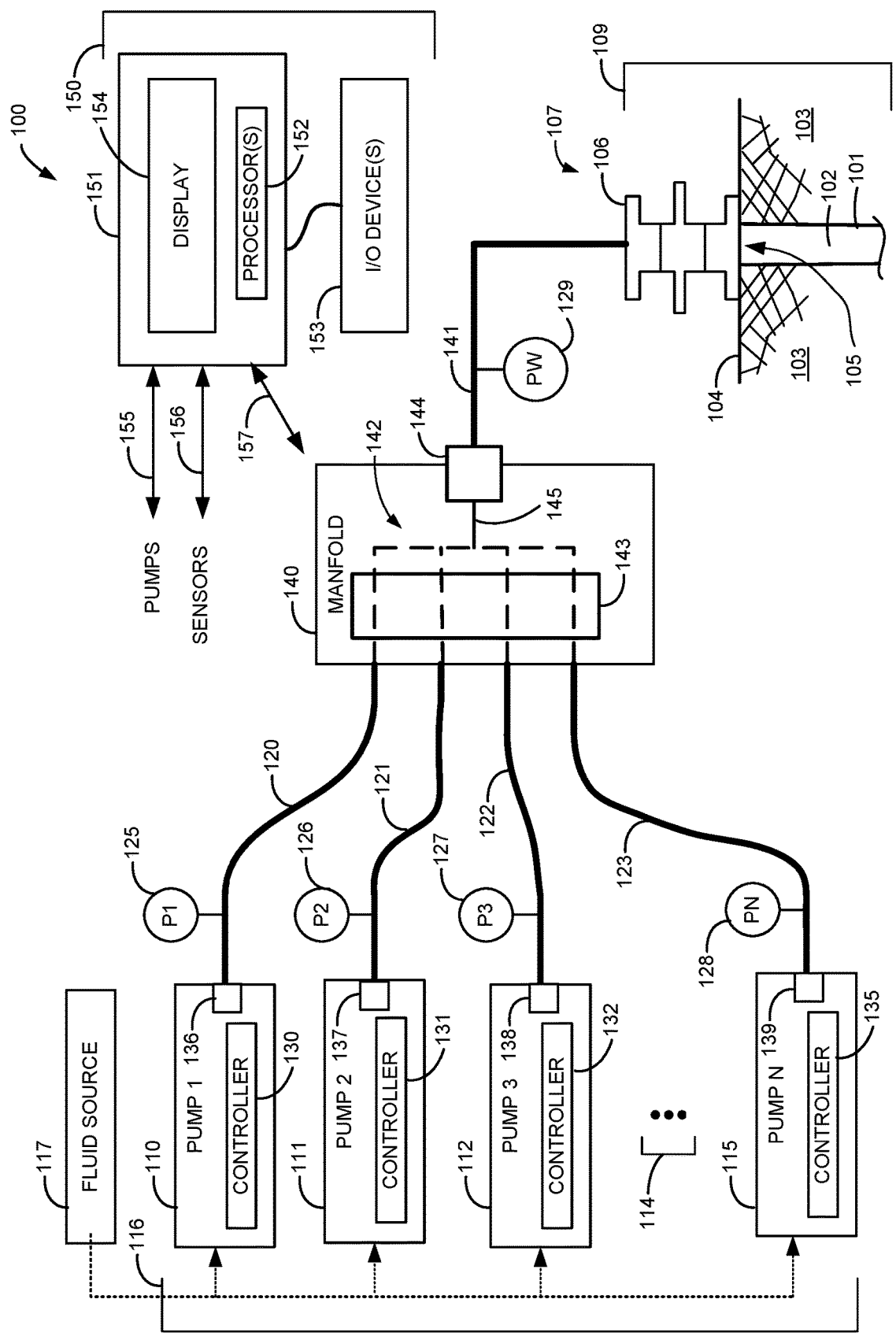
FIG. 1 illustrates a conceptual block diagram of a pressure test system in a wellbore environment in which pressure testing apparatus, methods, and systems may be deployed in accordance with embodiments of the disclosure.

The drawings are provided for the purpose of illustrating example embodiments. The scope of the claims and of the disclosure are not necessarily limited to the systems, apparatus, methods, or techniques, or any arrangements thereof, as illustrated in these figures. In the drawings and description that follow, like parts are typically marked throughout the specification and drawings with the same or coordinated reference numerals. The drawing figures are not necessarily to scale. Certain features of the invention may be shown exaggerated in scale or in somewhat schematic form, and some details of conventional elements may not be shown in the interest of clarity and conciseness.

DETAILED DESCRIPTION

In the following detailed description of the illustrative embodiments, reference is made to the accompanying drawings that form a part hereof. These embodiments are described in sufficient detail to enable those skilled in the art to practice the techniques and methods described herein, and it is understood that other embodiments may be utilized and that logical structural, mechanical, electrical, and chemical changes may be made without departing from the scope of the disclosure. To avoid detail not necessary to enable those skilled in the art to practice the embodiments described herein, the description may omit certain information known to those skilled in the art. The following detailed description is, therefore, not to be taken in a limiting sense.

The embodiments described herein relate to systems, apparatus, methods, and techniques that may be used to perform automatic pressure testing of a frac iron configuration coupled to a well head of a borehole and providing a flow path for a fluid, such as a fracturing fluid, to be contained and transported between a plurality of pumps and the well head. As used herein the terms "frac iron" and "frac iron configuration" may be used interchangeably, and refers to any set of devices arranged to provide a flow path for a fluid, such as but not limited to a fracturing fluid, between a plurality of pumps and a well head of a borehole. The devices included in "frac iron" and/or in a "frac iron configuration" may include fluid conduits such as metal pipes and/or flexible pressure-rated hoses arranges to provide a flow path to contain, deliver, and transport a fluid, such as a fracturing fluid, between the plurality of pumps and the well head of a borehole.

Additional devices that may be included in "frac iron" and/or a "frac iron configuration" include one or more manifolds configured to controllably couple, and in some instances de-coupled, various combination of piping and/or hoses included in the system, and the coupling devices used to physically couple the various components of the frac iron configuration together to form seals able to withstand fluid pressures present within the frac iron and/or frac iron configuration. Additional devices may also include one or a combination of check valves and/or choke valves configured to provide fluid coupling and decoupling between one or more portions of the frac iron configuration. Devices included when referring to "frac iron" or a "frac iron configuration" are not limited to devices that are formed in whole or in part of material comprising iron, or an alloy comprising iron, and may be formed from any material suitable for constructing the flow path included in the frac iron configuration.

As used herein, the phrase "automatic pressure testing" includes any type of system, apparatus, method, and/or technique that utilized a computer system or other type of controller, such as but not limited to a programmable logic controller, to control at least some aspect or processes performed as part of the pressure testing of a frac iron configuration. The terms "computer system" and "controller" may be used interchangeably, and may refer to any type of programmable device that can receive inputs and provide outputs to control the operation of the devices described herein as being included in a leak test system. The phrase "automatic pressure testing" does not require that the pressure testing procedure be completely performed by the computer system or the controller, and embodiments may include the computer system or controller interacting with and receiving inputs from a human operator, such as a field technician or an engineer, before, during, and/or after the automatic pressure testing procedure is being or was performed. For example, a computer system performing an automatic pressure testing procedure on a frac iron configuration may receive input values for parameters, such as target pressurization values, evaluation time periods, and threshold bleed off pressures, as further described below, before and/or during the actual automatic pressure testing procedure. In some embodiments, at any time during an automatic pressure testing procedure when a leak in the frac iron configuration is detected, the computer system that is performing the automatic testing procedure may request and/or require an input from an operator, such as a technician or an engineer, indicating whether the automatic pressure testing procedure is to continue, and/or if one or more portions of the frac iron configuration may be isolated from additional portions of the frac iron configuration as part the continuation of the pressure testing procedure.

In general, and in view of the high pressures (i.e., fluid pressures in a range of 10,000 to 20,000 pounds/square inch (psi)), of the fracturing fluids required to be safely contained and transported through the frac iron configuration, the frac iron needs to be pressure tested before commencing a fracking procedure that utilized the frac iron configuration for delivery of fluid. This testing procedure may be performed by closing a choke valve at the well head to "deadhead" the pumps providing the fluid pressure to the frac iron configuration. The pumps are then operated to pressurize the frac iron configuration, and changes in pressure with respect to time are measured to determine if there are any leaks in the frac iron configuration. Many of the existing techniques for monitoring for leaks in the frac iron are often not automated, and are often not consistent with respect to leak detection.

Embodiments of the systems, apparatus, methods and techniques described herein may provide a more consistent and potentially safer method for conducting a pressure test of a frac iron configuration. Embodiments include one or more methods for using pumps and a computer system or controller to perform automatic pressure testing on the frac iron configuration. Embodiments of the automatic pressure testing as described herein may include one or more of the following features:

- increasing the pressure in the frac iron by applying pressure from various pump configurations utilizing different numbers of pumps at different stages of the automatic pressure testing;
- controlling the pumping horsepower used by the various pump configurations as the pressure applied to the frac iron configuration increases;
- detecting leaks in the frac iron configuration including evaluating whether a measured pressure drop within one or more portions of the frac iron configuration monitored over a predefined evaluation time period results in a bleed off of pressure at a rate or in an amount that is greater than a predetermined threshold value; and
- increasing the fluid pressure applied by the pump configurations within the frac iron configuration in incremental steps using different predefined evaluation pressures, and evaluating the frac iron configuration for leaks at each of the predefined evaluation pressures up to and including a maximum pressure value.

In various embodiments, at each of the predetermined evaluation pressures, an acceptable bleed off rate is calculated from one or a combination of parameters, including but not limited to: the number of pumps operating, the pumping horsepower, the volume in the tubing of the frac iron, the fluid in the tubing of the frac iron, the compressibility of the fluid, the dimensions of the tubing included in the frac iron, the applied pressure, and/or the stretch in the tubing included in the frac iron. In various embodiments, pumping may be stopped during each of the evaluation time periods used to monitor for bleed off of the fracturing fluid pressure once the frac iron configuration has been pressurized to any one of the predefined evaluation pressures. In various embodiments, some positive integer number of pressure testing cycles are performed, each pressure testing cycle performed at an increasingly higher predetermined evaluation test pressure, in a stepwise fashion up to and in some instances including a pressure testing cycle performed at the maximum pressure rating determined for the frac iron configuration being tested.

Embodiments of the methods and techniques described herein allow for automatic pressure testing using stepped pressure increases, which may include an algorithm for determining factors such as the compressibility of the fluid and the metal stretching of the devices including in the frac iron configuration. The use of the stepped pressure increases may allow for leaks in the frac iron to be detected earlier and at lower fluid pressure, thus increasing the overall safety of the pressure testing process. Additionally, the systems, apparatus, methods, and techniques described herein assures that the pressure limits for the frac iron configuration are maintained and that maximum pressure ratings are not exceeded. Because it is often easy to exceed the pressure limits during manual leak testing, especially as additional pumps are added to the process, embodiments of the automatic pressure testing procedure as described herein may provide an additional level of safety compared to manual leak testing procedures. Further, embodiments of the automatic pressure testing as described herein may provide more accuracy and more safety for the pressure testing procedures, and which may be performed more quickly relative for example to manual or other testing procedures.

FIG. 1 illustrates a conceptual block diagram of a pressure test system 100 in a wellbore environment in which pressure testing apparatus, methods, and systems may be deployed in accordance with embodiments of the disclosure. Pressure test system may be configured to perform automatic pressure testing procedures on a frac iron configuration in a wellbore environment. Pressure test system 100 includes a well bore, generally indicated by bracket 109, and a frac iron test apparatus generally indicated by bracket 116. In various embodiments, pressure test system 100 may include a computer controller, generally indicated by bracket 150. In other examples, one or more individual controllers, such as controllers 130, 131, 132 and 135, may perform some or all of the functions ascribed to computer controller as described in further detail below.

As shown in FIG. 1, a wellbore includes a borehole 102 extending from a surface 104, such as the earth's surface, and downward into a formation 103. The borehole 102 may include a casing 101 that encloses at least some portion of the borehole extending from surface 104 into the formation 103 to some depth extending away from a top opening 105 of the borehole at the surface. A choke valve 106 comprising one or more connections and/or shut-off valves may be positioned at the top opening 105, and arranged to couple to the casing 101 and thus seal off the borehole 102 relative to the area 107 above surface 104.

Pressure test system 100 may include a manifold 140 configured to couple one or more pump lines to a main line 141 extending between the manifold and choke valve 106. As illustrated in FIG. 1, pressure test system 100 includes pump lines 120, 121, 122, and 123 coupled to manifold 140. Manifold 140 is configured to controllably couple pump lines 120, 121, 122, and 123 individually, or in any combination, to the main line 141, as illustratively shown by internal flow network 142. Pump lines 120, 121, 122, and 123, along with manifold 140 and main line 141, may be configured to form what is referred to as "fracking iron," and comprise an arrangement of piping, valves, manifold(s) and device couplings that are intended to allow fracturing fluid to be transported to and introduced into the borehole 102 for the purpose of stimulation of the wellbore. Before starting the actual fracturing process, pressure test system 100 may be configured and operated, according to the various embodiments as described herein, and/or according to variations thereof, to automatically pressure test the fracking iron, which includes pump lines 120, 121, 122, 123, manifold 140, and main line 141. Pressure testing may be performed in order to determine if leaks exist in the system, and/or to confirm that the system is adequately configured to withstand the maximum fluid pressures that the fracking iron may be exposed to during a fracturing process.

In various embodiments of pressure test system 100, each of the pump lines 120, 121, 122, and 123 is in fluid communication with a respective pump. As shown in FIG. 1, pump line 120 is coupled to pump 1 (110), pump line 121 is coupled to pump 2 (111), pump line 122 is coupled to pump 3 (112), and pump line 123 is coupled to pump N (115). Each of pumps 110, 111, 112, and 115 are configured to provide a controllable fluid pressure to the respective pump lines 120, 121, 122, and 123 by pumping a fluid, such as a fluid supplied by fluid source 117 coupled to each of the pumps, into the respective pump lines, and to generate a fluid pressure in the pump line. The fluid used may be in some embodiments the fracturing fluid that will be later utilized in fracturing processes utilizing the frac iron configuration, or in some embodiments the liquid portion of the fracturing fluid (without proppant). In an alternative embodiment, the fluid used to pressure these the frac iron configuration may be water, for example which may be used more safely in pressure testing the system prior to performing an acid fracturing operation utilizing the frac iron configuration.

For example, pump 1 (110) may be coupled to fluid source 117 to receive a fluid, such as a fracturing liquid, and to pump the fluid into pump line 120 to generate a fluid pressure in pump line 120. Similarly, pump 2 (111) may be coupled to fluid source 117 to receive fluid, and to pump the fluid into pump line 121 to generate a fluid pressure in pump line 121, pump 3 (112) may be coupled to the fluid source 117 to receive fluid, and to pump the fluid into pump line 123, and pump N (115) may be coupled to fluid source 117 to receive fluid, and to pump the fluid into pump line 123 to generate a pressure in pump line 123. Embodiments of pressure test system 100 are not limited to having four pumps, or to any particular number of pumps, and may include a single pump or a plurality of pumps, such as two pumps, three pumps, or four or more pumps, as indicated by dots 114.

In various examples, each of the pump lines provided in pressure test system 100 may include a sensor coupled to or otherwise linked to a respective pump line, and configured to provide an output indicative of a pressure level that is present within the pump line. As shown in FIG. 1, pump line 120 is coupled to pressure sensor 125, pump line 121 is coupled to pressure sensor 126, pump line 122 is coupled to pressure sensor 127, and pump line 123 is coupled to pressure sensor 128. Each of pressure sensors 125, 126, 127, and 128 may be configured to provide an output, such as an electrical output signal, that is indicative of the pressure level that is present in the respective pump line to which the sensor is coupled.

As illustrated in FIG. 1, pump lines 120, 121, 122, and 123 are coupled to and are in fluid communication with manifold 140. Manifold 140 includes internal flow network 142 that may be used to provide fluid communication between pump lines 120, 121, 122, and 123 and main line 141. Manifold 140 may include one or more control valves, generally indicated as control valves 143 and 144. Control values 143 may be operated to selectively and controllable couple one, more than one, or all of pump lines 120, 121, 122, and 123 to manifold output line 145. In addition, manifold 140 may include a control valve 144 that allows the manifold output line 145 to be selectively and controllably coupled and decoupled from main line 141.

By controlling control valves 143 and 144, any combination and/or all of pump lines 120, 121, 122, and 123 may be controllable coupled and decoupled from manifold output line 145. In addition to being operable to couple and decouple pump lines from the manifold output line, control valves 143 may include check valves that may be configured to prevent a backflow of fluid and/or the application of backpressure into a given pump line from one or more of the other pump lines. For example, a check valve may be included as part of control valve 143 that is coupled with pump line 120, and is configured to prevent any fluid pressure and fluid flow generated by fluid pressure in any of pump lines 121, 122, 123, and in main line 141 from being applied back through manifold 140 and into pump line 120. Similarly, control value 143 may including individually controllable check valves that prevent fluid backflow and fluid backpressure from being applied to a respective one of pump lines 121, 122, and 123.

In addition to the check valve function that may be provided by control valve 143, each of pumps 110, 111, 112, and 115 may include a respective control/check valve 136, 137, 138 and 139. Control/check valves 136, 137, 138, and 139 may be arranged to selectively and controllable open and close off the respective pump line coupled to the control/check valve so that any pressure present in the respective pump line cannot bleed off pressure into the respective pump, for example when the respective pump is not running or is running at a level that would not allow the pump to overcome the exiting pressure in the respective pump line. For example, control/check valve 136 is coupled to pump line 120 at pump 1 (110). Control check valve 136 may be configured to be selectively and controllably opened to allow fluid flow and fluid pressure generated by pump 110 to be coupled to pump line 120, and to be selectively and controllable closed in order to seal off fluid flow and fluid pressure present in pump line 120 from backflowing and/or bleeding off back through pump 110. Similarly control/check valve 137 may be configured to selectively and controllably couple and decouple pump line 121 with pump 111, control/check valve 138 may be configured to selectively and controllably couple and decouple pump line 122 with pump 112, and control/check valve 139 may be configured to selectively and controllably couple and decouple pump line 123 with pump 115.

By controlling pumping operations of pumps 110, 111, 112, and 115, and by selectively controlling control/check valves 136, 137, 138, 139, pressure test system 100 may operate one or more of pumps 110, 111, 112, and 115 to provide fluid pressure to respective pump lines 120, 121, 122, and 123. By further controlling control valves 143 and 144 within manifold 140, pressure test system can control the coupling of fluid pressures and fluid flows from each of the pump lines to main line 141 and between other pump lines. Further, by controlling valve 144 of manifold 140, coupling and decouple of the main line 141 from all of the pump lines 120, 121, 122, 123 to isolate main line 141 from manifold output line 145 is possible. By doing so, and because choke valve 106 may be configured to seal off the end of main line 141 at the top opening 105 of borehole 102, any fluid pressure present within main line 141 can be sealed at both ends of main line 141. Pressure sensor 129 may be coupled to main line 141 and configured to provide an output, such as an electronic signal, that is indicative of the fluid pressure present within main line 141.

Figure 5:
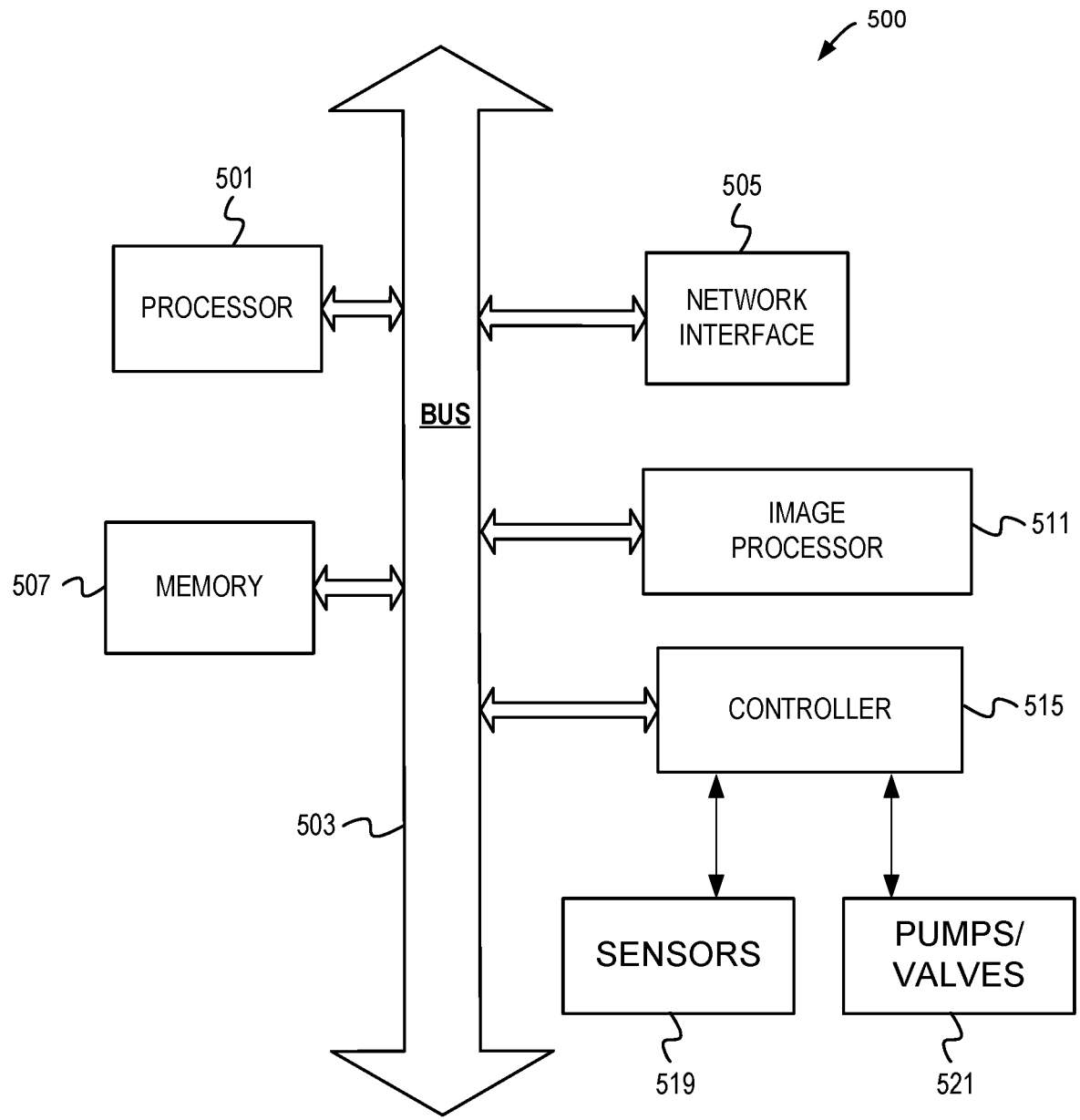
FIG. 5 illustrates a block diagram of an example computing system that may be employed to practice the concepts, methods, and techniques disclosed herein, and variations thereof.

The automatic pressure testing procedures performed by pressure test system 100 may be controlled at least in part by computer system 151. Computer system 151 may include one or more processors, which for simplicity are hereinafter referred to as processor 152. Processor 152 is not limited to any particular type of processor, and may include multiple processors and/or different types of processors, such as a general processor and an image processor. Processor 152 may be coupled to memory, (such as memory 507 as shown in FIG. 5), that stores programs, algorithms, and parameter values that processor 152 operates on to perform the automatic pressure testing procedures performed by pressure test system 100. Computer system 151 may include a display 154, which may be an interactive display such as a touch screen. Computer system 151 may including one or more I/O devices 153, such as but not limited to a computer keyboard, a computer mouse, or other known devices that allow a system operator, such as a technician or engineer, to interact with computer system 151.

Computer system 151 may also include one or more sets of communication links 155, 156, 157, that allow computer system 151 to communication with other devices included within pressure test system 100. For example, communication link 155 may be configured to communicatively couple computer system 151 to pumps 110, 111, 112, and 115, for example to communicate with controllers 130, 131, 132 and 135 located at the pumps. Communication link 155 may also provide computer system 151 with communication capabilities that allow computer system 151 to have control over check valves 136, 137, 138, and 139. Communication link 156 may be configured to communicatively couple computer system 151 to sensors 125, 126, 127, 128, and 129, for example to receive electrical signal outputs corresponding to pressure sensor reading being made by these sensors. Communication link 157 may be configured to communicatively couple computer system 151 to devices located at manifold 140, such as control/check valves 143 and 144, for example to control the coupling and decoupling functions that may be provided by these control/check valves. Communication links 155, 156, 157 are not limited to any particular type of communication link, communication medium, or communication formats, and may include any combination of communication links, mediums, and formats determined to be appropriate for use in the wellbore environment where the pressure test system 100 may be utilized.

Computer system 151 may be configured to control or provide control commands to controllers 130, 131, 132, and 135 of pumps 110, 111, 112 and 115 to control the operation of the pumps in conjunction with control over valves 136, 137, 138 and 139 at pumps 110, 111, 112, 115, and also valves 143 and 144 of manifold 140 to automatically perform one or more cycles of pressure testing on the frac iron configuration of pressure test system 100. In addition, computer system 151 may be configured to receive the output signals provided by sensors 125, 126, 127, 128, 129, and other sensors that may be part of pressure test system 100. By controlling and monitoring these devices, computer system 151 may perform an automatic pressure testing procedure on a frac iron configuration, such as the frac iron configuration as illustrated and described with respect to FIG. 1, using various predefined test parameters and test values to render a leak test status for the frac iron configuration.

For example, by controllably pressurizing pump lines 120, 121, 122, 123, the flow paths through manifold 140, and main line 141, pressure sensors 125, 126, 127, 128, and 129 may be monitored by computer system 151 and processor 152 to determine whether leaks exists in the frac iron configuration. By controlling pumps 110, 111, 112, and 115, and in conjunction with check valves 136, 137, 138, and 139, computer system 151 and processor 152 may control various operations of the pumps to pressurize the frac iron configuration to increasingly higher levels of pressure. In some embodiments, initial pressurization of the frac iron configuration includes operating all pumps 110,111, 112, and 115 to pressurize the frac iron configuration to some initial pressure level, generally a pressure level that is much less, (e.g., 5 to 30 percent) of the Pmax maximum pressure level for the frac iron configuration. Valves 143 and 144 of manifold 140 are also controlled by computer system 151 and processor 152 to allow fluid pressure generated within the pump lines 120, 121, 122, and 123 to be fluidly coupled to main line 141, thus pressuring main line 141 to the initial pressure level.

Once the initial pressure level is established, pumping may be halted, and pressure levels in each of the pump lines 120, 121, 122, and 123, along with the pressure level in main line 141, may be monitored for example over some predetermined evaluation time period. In some embodiments, at the expiration of the evaluation time period, the pressure levels within each of the pump lines and within the main line are evaluated to determine whether a leak exists within the frac iron configuration. In some embodiments, if a leak is detected based on the monitored pressure levels, computer system 151 may output a request of some type for a user input may to determine how the pressure testing is to proceed. In some examples, the pressure testing may be terminated, and the location and/or cause of the detected leak may be determined and repaired. In some embodiments, when the monitoring of the pressures over the evaluation time period indicates a leak is detected, control valves 143, 144 and in some embodiments check valves 136 137, 138, and 139 may be configured to individually isolate each of pump lines 120, 121, 122, and 123 and main line 141 from one another, Once the pump lines and the main line are individually isolated, pressure within each individual line may again be monitored over a predetermined evaluation time period, and the monitored pressures values at the expiration of the evaluation time period may be evaluated to determine which individual device or devices are causing or contributing to the pressure leak or leaks within the frac iron configuration. In some examples, before isolating each individual pump line and the main line from each other, the system may be repressurize these lines to the original initial pressure level that was used during the initial pressure test cycle. The steps of pressure testing the individual lines may be helpful in locating the specific device or devices where the pressure leak or leaks are occurring.

In some embodiments, if a pressure leak is determined to exist in a particular device of the frac iron configuration, that device may be isolated from the additional devices of the frac iron configuration, and the pressure testing of the remaining additional devices may continue with pressure testing at one or more elevated pressure levels. In instances where no leak was detected as a result of the initial pressure testing cycle, the pressure testing may continue with one or more rounds of additional pressure testing cycles.

In a next pressure testing cycle following the initial pressure testing cycle, the frac iron configuration is further pressurized to a next predetermined pressure level using a second pump configuration. The next predetermine pressure level may be higher than the pressure level used to pressurize the frac iron configuration in the initial pressure testing cycle. The next predetermined pressure level may be less than the Pmax maximum pressure level, wherein the next pressure level may be for example in a range of twenty to fifty percent of the Pmax maximum pressure level. The second pump configuration may be different or the same pump configuration as was used to pressurize the frac iron configuration in the initial pressure testing cycle. For example, the second pump configuration may utilize a number of pumps that is less than the total number of pumps used during the initial pressurization cycle. In other examples, the second pump configuration may utilize a same number of pumps as was used in the initial pressure testing cycle, but while operating one or more of these pumps at one or more horsepower settings that is different from the horsepower settings used to configure the pumps in the initial pressure testing cycle. In some embodiments, a combination of the number of pumps and/or horsepower settings for the pumps being utilized may be configured as the second pump configuration that differs from the pump configuration used for the initial pressurization cycle of the pressure testing.

Once the frac iron configuration is pressurized to the next predetermined pressure level, a second evaluation time period begins, and at the expiration of the second evaluation time period, a determination is made by processor 152 with respect to any leaks being detected in the system based again on the pressure readings provided by the pressure sensors coupled throughout the frac iron configuration. At the expiration of the second evaluation time periods associated with the testing being performed at the next predetermined pressure level, a determination that a leak has been detected may result in a same set of options as was present with respect to the initial pressure testing cycle. For example, an output may be provided by computer system 151 indicting that a leak has been detected, and an input from an operation may be required to determine if the automatic pressure testing procedure is to be continued, or if the pressure testing procedure is to be terminated.

If leak testing is to be continued on all or some portion(s) of the frac iron configuration, and assuming the pressure level utilized in the previously conducted pressure testing cycle was not equal to the Pmax maximum pressure level, another cycle of pressure testing may be initiated, including, pressurizing the frac iron configuration to a next and higher pressure level using some next pump configuration, and once the desired next and higher pressure level is achieved within the frac iron configuration or the portion of the frac iron being tested, the predetermined evaluation time period is commenced. Pressure levels within the frac iron are monitored over the predetermined evaluation time period, and when expiration of the evaluation time period has occurred, the monitored pressure values are evaluated to determine whether any leaks are detected at this higher pressure level. Again, any of the options described above with respect to the initial cycle of pressure testing cycle and/or the second pressure testing cycle may be available with respect to this most recently performed pressure testing cycle with respect to whether a leak is or is not detected.

In some embodiments, this process of evaluating the pressure levels in the frac iron configuration, monitoring the pressure levels within the frac iron configuration over an evaluation time period, and at the expiration of the evaluation time period evaluating the monitored pressure levels to determine if a leak is present may be repeated any number of times until automatic pressure testing procedure has been terminated, for example in response to an input to terminate made by a system operator, or the pressure testing cycle utilizing the final and highest pressure level has been completed. If the pressure testing cycle utilizing the final pressure testing level has been completed and no leaks have been detected using this highest level of pressure testing, the frac iron configuration may be assigned an overall status of "PASS" with respect to leak testing. A status of "PASS" may be required to then allow the frac iron configuration to be utilized for the purpose of transporting pressurized fraction fluid to wellbore 102 as part of a fracking procedure. Otherwise, if one or more leaks were detected in the highest level pressure testing, the frac iron configuration may be considered as have an overall status of "FAIL" with respect to leak testing. An overall status of "FAIL" may be an indication that the frac iron configuration is not be suitable for use in delivering fracturing fluid to wellbore 102 in a fracking process unless and until further repairs and or further pressuring testing is performed.

With respect to each of the pressure testing cycles describe above, including the initial pressure testing cycle, and any addition pressure testing cycles including the final pressure testing cycle, a same or a different pump configuration may be utilized, between each of the completed pressure testing cycles and a next or subsequent pressure testing cycle. A different pump configuration may include any combination of a same or a different number of pumps being utilized and/or use of the same or a different number of pumps operating at different horsepower settings. Further, the evaluation time periods used to monitor the pressure levels during any given pressure testing cycle may be different time periods compared to the evaluation time period used on other pressure testing cycles. For example, an evaluation time period utilized during a given pressure testing cycle may be set to a shorter time period, a same time period, or a loner time period compared to the evaluation time period utilized by any of the previous pressure testing cycles and/or by subsequent pressure testing cycles.

In addition, the criteria used at the expiration of an evaluation time period to determine if a leak is present in the frac iron configuration is not limited to any particular criteria or technique, and may include any detection criteria based on the pressure levels that were monitored over the evaluation time period for that respective pressure testing cycle. In various embodiments, a same set of evaluation criteria may be used for determining if leak(s) were detected during each pressure testing cycle performed as part of an automatic pressure testing procedure. In some embodiments, different sets or different types of decision criteria based on the monitored pressure level measurements may be applied to one or more of pressure testing cycles to determine if leak(s) were detected as a result of running that particular pressure testing cycle. Thus, pressure test system 100 may be operated with a large degree of flexibility with respect to pump configurations, evaluation time periods, the number and variations in the pressure levels used, the total number of pressure testing cycle performed as part of an given automatic pressure testing procedure, and the criteria used to determine whether leak(s) were detected over the flexible number of pressure testing cycles that the system may perform in the process of establishing an overall pressure testing status for frac iron configuration.

A non-limiting example of a leak testing procedure that pressure test system 100 may perform on the frac iron configuration generally indicated by bracket 116 is described as follows. An initial purge of the frac iron system may be performed before initiating the automatic pressure testing procedure. For example, choke value 106 may be opened to couple main line 141 to area 107 and/or to wellbore 102, and manifold 140 may be configured to couple each of pump lines 120, 121, 122, and 123 to main line 141. Each of pumps 110, 111, 112, and 115 may then be started and operated to provide a fluid flow to each of the respective pump lines. The fluid flow generated by pumps 110, 111, 112, and 115 may fill the respective pump lines 120, 121, 122, and 123 with a fluid, such as a fractioning fluid provided by fluid source 117, thus purging the pump lines of any gases or other fluids not intended to be included as part of the pressure testing procedure. The fluid flow may continue to purge the fluid paths within manifold 140 coupled to the pump lines, and extend into main line 141, purging these fluid passageways of any gases and other fluids that may be expelled out of the choke value 106. Once purging has been completed, choke valve 106 may be closed off to deadhead main line 141 relative to area 107 and borehole 102, and all pumps may be shut off, leaving the frac iron configuration sealed off between pumps 110, 111, 112, 115 and choke valve 106, and with fluid communication pathways being open between the pump lines 120, 121, 122, 123 through the fluid network of manifold 140 to main line 141. At the completion of the purge process, the frac iron configuration may be filled with the same fluid that will be utilized to pressure test the frac iron, and with no fluid pressure or a very low level of fluid pressure present within the frac iron.

Pressure test system 100 may initialize the automatic pressure testing procedure under the control of computer system 151 based, at least in part, on program instructions executed by processor 152. Processor 152 also receives or has access to various parameters associated with the automatic pressure testing procedure, including the number and operating parameters for controlling the pumps, the configuration of the flow passages through manifold 140, and values for any parameters to be controlled during the pressure testing procedure. The processor 152 also receives or has access to (for example in stored memory) a predetermined value for the maximum applied pressure (Pmax), the time value for the evaluation time periods, the maximum allowable bleed off pressure threshold values to be utilized to evaluate the pressure measurements during each of the pressure testing cycles, the number of pressure testing cycles to be performed, and the predetermined pressure level to be used at each pressure testing cycle. In this example and for the sake of illustration and simplicity, a same evaluation time period is used for each of the pressure testing cycle, and a fixed number of three total pressure testing cycles are described, although embodiments of the automatic pressure testing procedure are not limited to these particular ranges and/or numbers. In various embodiments, a typical evaluation time period is in the range of seconds, or in some embodiments up to one minute, and in other embodiments to a time period of over one minute long.

In some embodiments, the maximum allowable bleed off is a pre-determined value that can be measured in terms of pressure drop over the evaluation time, pressure drop per minute measured over the evaluation time, the fractional change in pressure, et cetera, and are examples of criteria that may be used throughout and/or at the expiration of any evaluation time period to determine whether a leak in the frac iron was detected. The maximum allowable pressure drop over the evaluation time period will depend on the configuration of the frac iron. For example, an equally sized leak will cause a rapid pressure drop if the tubing volume is small, and a slower pressure drop if the tubing volume is large. The allowable pressure drop is a function of the compressibility of the fluid in the tubing, the stretch of the tubing, and the leakage past pump check valves. As a result, the acceptable maximum bleed off may be calculated from one or a combination of parameters including: the number of pump trucks, the pumping horsepower, the volume in the tubing, the fluid in the tubing, the compressibility of the fluid, the dimensions of the tubing, the applied pressure, and the stretch in the tubing.

At the initiation of the automatic pressure testing procedure, a complete set of pumps including pumps 110, 111, 112, and 115 are operated to pressurize the frac iron configuration to the initial evaluation pressure. Use of all pumps allows for the pressure to rise more quickly, thus saving time. Use of all pumps also allows for verifying the connection on all of the pumps. The target initial evaluation pressure may be set at a value of approximately one-third the Pmax pressure level (approximately means +/−20 percent of the Pmax pressure level). Once the initial evaluation pressure is achieved within the frac iron configuration, the initial evaluation time period is started and runs for the evaluation time period predetermined for this initial pressure testing cycle. During the evaluation time period, pressure sensor 125, 126, 127, and 128 and 129 monitor and collect data indicative of the pressure levels within the frac iron configuration at their respective positions throughout the frac iron configuration. At the expiration of the evaluation time period, the monitored pressure data from the pressure sensors is evaluated based on the criteria that was chosen for evaluating whether a leak was detected as a result of the initial pressure testing cycle.

If a determination is made that a leak was detected as a result of the initial pressure testing cycle, computer system 151 may output an indication, such as causing a visual indication to be displayed on display 154, that a leak has been detected. In addition, computer system 151 may request an input from an operator, such as a technician or an engineer, as to how to proceed. Options may include terminating the automatic pressure testing procedure, or to continue the automatic pressure testing procedure including all or selected portions of the frac iron configuration.

Assuming that no or minimal leaks are detected as a result of the initial pressure testing cycle, or that an input was received from an operator to continue the pressure testing procedure despite detection of a leak, a second pressure testing cycle is initiated. As part of the second pressure testing cycle, processor 152 configures a second pump configuration to operate to pressurize the frac iron configuration (or parts thereof) to a second evaluation pressure level that is higher than the pressure level used during the initial pressure testing cycle. In one embodiment, the second pumping configuration includes settings for one or more of pumps 110, 111, 112, and 115 using pumping horsepower settings that are reduced as the pressure continues to build. Reducing the amount of pumping horsepower may also be accomplished in part or in its entirety by engaging a fewer number of pumps. This techniques of reducing pumping horsepower as the pressure level within the frac iron configuration increases may help to quickly build to the target pressure level for the second pressure testing cycle without risking over pressurizing the system. One of the features of this approach is to reduce or to eliminate the number of times that a pump is switched in-and-out of the neutral position. In a standard pressure test, the pumps may be switch through neutral as many as sixty-five times in order to slowly inch the pressure towards the target pressure level. These switching through neutral creates substantial wear on the transmission and on the pumps. By utilizing the incremental pressure levels applied to the pressure testing procedures as described herein, the number of switches required by the pumps may be minimized or at least reduced, thus reducing wear on the transmissions and on the pumps.

Once the second target pressure level is achieved within the frac iron configuration or portions thereof being tested, the second evaluation time period is initiated, and extends over the time period defined for the predetermined evaluation time period. At the initiation of the second evaluation time period, all of pumps 110, 111, 112, 115, including any of the pumps that were utilized in the second pressure testing cycle to achieve the second evaluation pressure level, may be shut off so that no further pressure is applied to the frac iron configuration. In this configuration each of check valves 136, 137, 138 and 139 may prevent any backflow of pressure out of the frac iron configuration through the pumps, and therefore, any loss in fluid pressure within the frac iron configuration may be attributed to leaks in the frac iron configuration itself. Thus, the entirety of the frac iron configuration, including pump lines directly coupled to pumps not utilized in the second pump configuration to provide additional fluid pressure, may still be pressure tested as part of the second pressure testing cycle.

During the second evaluation time period, pressure sensors coupled to the frac iron configuration monitor the pressure levels within various portions of the frac iron configuration. At the expiration of the second evaluation time period, a determination is made, based on the monitored pressure levels, whether a leak in the frac iron configuration has been detected. In a manner the same as or similar to that described above with respect to the initial pressure testing cycle, any options may be available with respect to the automatic pressure testing procedure if a leak has been detected, including termination of the automatic pressure testing procedure or continuation of the automatic pressure testing procedure on some portion of the frac iron configuration or on the entirety of frac iron configuration.

Assuming that no leaks are detected as a result of the second pressure testing cycle, or that an input was received from an operator to continue the pressure testing procedure despite detection of a leak, a next and final pressure testing cycle is initiated by the processor. In this example, the target evaluation pressure level may be set to the Pmax maximum pressure level. As part of the final pressure testing cycle, processor 152 configures a final pump configuration to operate to pressurize the frac iron configuration (or parts thereof) to the final evaluation pressure level, which is a higher pressure level than the pressure level used during the second pressure testing cycle. In one embodiment, the final pumping configuration includes settings for one or more of pumps 110, 111, 112, and 115 using pumping horsepower settings that are reduced as the pressure continues to build, and/or that may utilize a lower pumping horsepower setting compared to the pumping horsepower setting the was utilized during the second pressure testing cycle.

Reducing the amount of pumping horsepower utilized in the final pumping configuration may also be accomplished in part or in its entirety by engaging a fewer number of pumps and/or by reducing the pumping horsepower setting for any of the pumps being utilized as part of the final pumping configuration. Again, this technique of using a smaller number of pumps and/or of reducing pumping horsepower of the pumps included in the final pump configuration as the pressure within the frac iron configuration increases may help to quickly build the test pressure to the targeted evaluation pressure level for the final pressure testing cycle without risking over pressurizing the system. This may be particularly critical as the pressure level within the frac iron configuration approaches the target pressure level for the final pressure testing cycle, as the target level may be set at the Pmax maximum pressure level. Thus, any pressurization above the target final pressure level may exceed the Pmax maximum pressure level, creating a potentially damaging and/or unsafe condition. A pressure value for Pmax is typically on the order of 10,000 PSI to 20,000 PSI, and may reflect the pressure levels that the frac iron configuration must be able to safely withstand when being utilized as part of a fractioning process being performed on borehole 102.

Once the final evaluation pressure level is achieved within the frac iron configuration or portions thereof being tested, the final evaluation time period is initiated, and extends over the time value of the predetermined evaluation time period. At the initiation of the final evaluation time period, all of pumps 110, 111, 112, 115, including any of the pumps that were utilized in the final pressure testing cycle to achieve the final evaluation pressure level, may be shut off so that no further pressure is applied to the frac iron configuration. Again, in this configuration each of check valves 136, 137, 138 and 139 may prevent any backflow of pressure out of the frac iron configuration through the pumps, and therefore any loss in fluid pressure within the frac iron configuration can be attributed to leaks in the frac iron configuration itself. Again, as was the case during the second pressure testing cycle, the entirety of the frac iron configuration, including pump lines directly coupled to pumps not utilized in the final pump configuration to provide additional fluid pressure, may still be pressure tested as part of the final pressure testing cycle.

During the final evaluation time period, pressure sensors coupled to the frac iron configuration monitor the pressure levels within various portions of the frac iron configuration. At the expiration of the final evaluation time period, a determination is made, based on the monitored pressure levels, whether a leak in the frac iron configuration has been detected. If at the conclusion of the final evaluation time period no leaks have been detected, processor 152 may provide an output, such as an output that can be visually display on display 154, that a status of "PASS" has been assigned to the frac iron configuration as a result of the automatic pressure testing procedure. In the alternative, if at the conclusion of the final evaluation time period one or more leaks have been detected, processor 152 may provide an output, such as an output that can be visually displayed on display 154. that a status of "FAIL" has been assigned to the frac iron configuration as a result of the automatic pressure testing procedure. In some embodiments, assigning a status of "FAIL" indicates that the automatic pressure testing procedure only detected one or more leaks as a result of the final pressure testing cycle. In some embodiments, assigning a status of "FAIL" indicates that the automatic pressure testing procedure detected one or more leaks as a result of the any of the pressure testing cycles performed as part of the automatic pressure testing procedure. This option may be useful for example in situations wherein one or more leaks were detected during a pressure testing cycle that was performed at pressure levels less than the final evaluation pressure level, but because of an input provided by a system operator, the automatic pressure testing procedure was allowed to continue. In these instances, additional information related to which pressure testing cycle and/or which portions of the frac iron configuration where determined to have leaks may be generated by processor 152 and output, for example as visual displays provided to display 154, for further evaluation by a system operator, technician, or engineer.

The above described example of an automatic pressure testing procedure is provided as a non-limiting example, and many variations to this example are possible and contemplated for use in the automatic pressure testing procedure as described herein, and any equivalents thereof. For example, the number of pressure testing cycles performed in order to reach the final pressure testing level is not limited to any particular number of cycles, and may include a number of cycles that is deemed appropriate to confirm the integrity of the frac iron configuration in view the type of equipment and devices included in and coupled to the frac iron configuration. In some embodiments, between each step in the pressure testing procedure, a human operator may have the option of evaluating the pressure bleed off. The pressure bleed off is a measure for how the pressure drops with respect to evaluation time period. This measurement is functionally equivalent to a pressure retention measurement which measures how the pressure is maintained with respect to time. In some embodiments, the pumps are stopped during each of the evaluation time periods. The drop in pressure is noted over the evaluation time period. If the pressure drops more than then maximum bleed-off, then a leak is declared, the pressure is decreased, and the leak is isolated. However, an operator may have the option to override any such determination made by processor 152, and provide an input to the processor 152 as to how the automatic pressure testing procedure is to proceed.

A determination as to whether or not a leak has been detected at the conclusion of any given pressure testing cycle is not limited any particular criteria or to any particular evaluation technique. In some embodiments, the bleed-off pressure within one or within multiple portions of the frac iron configurations is/are monitored as the slope of the pressure curve. The slope of dP/dt is monitored. The change in the slope helps to identify the type of behavior that is causing the pressure bleed. For example, a leak in a connection is characterized by a quadratic pressure loss that persists over time. Compressibility or stretch in the tubing is a more rapid change that quickly equalizes. Air in the lines can cause rapid pressure changes but will equalize more rapidly than a tubing leak. The size of the leak can be estimated from the pressure change as well as other parameters of the pump operation. Knowing the size of the leak can help guide identifying the location of the leak. If pressure bleed-off attributed to tubing compressibility exceeds an expected value, processor 152 and provide an output signal to alert an operator. In some embodiments, the output signal can include an indication that a wall thickness of the tubing within some portion of the frac iron configuration has been diminished either due to erosion or to corrosion. If the wall thickness of the tubing is reduced, then more stretch will be encountered. A reduced wall thickness is also a sign of reduced pipe life. Any of these issues may be detected by the automatic pressure testing procedures, and brought to the attention of an operator for further review and possible repair.

In various embodiments, pressure signals provided by the pressure sensor or pressure sensors monitoring pressure level(s) throughout the frac iron configuration may be further processed for better quality and evaluation purposes. For example, in various embodiments the pressure data generated by the pressure sensor signal is frequency filtered. The pressure data may be low-pass filtered to see pressure trends, and/or high-pass filtered to see resonance behavior that is inherent to different sections of the frac iron. A combined band-pass filter can also be applied to the pressure data generated from the signals provided by the pressure sensors.

As described above, pressure sensors may be located at various locations throughout the frac iron configuration in order to allow for pressure monitoring at multiple locations. Due to the friction in the fluid flow pathway of the frac iron configuration, the pressure drop will be different at different locations. Thus, if there is a leak proximate for example to pressure gauge P1, that gauge will show a loss in pressure level occurring more quickly than the pressure levels being monitored by gauges at other locations. More distant locations with greater fluid friction in between, such pressure gauge PW, may have the slowest pressure decay. Thus, by comparing the relative rates of pressure losses at different pressure sensors, a determination may be made with respect to the approximate location of the pressure leak. In various embodiments, pressure test system 100 includes pressure sensors (not shown in FIG. 1) that are located between the check valves (check valves 136, 137, 138, 139) and each of the pumps 110, 111, 112, 115, respectively, which are configured for monitoring pressure levels behind the check values relative to the pump lines. Monitoring of these pressure levels using these additional pressure sensors can be useful in identifying leaking check valves.

Figure 2:
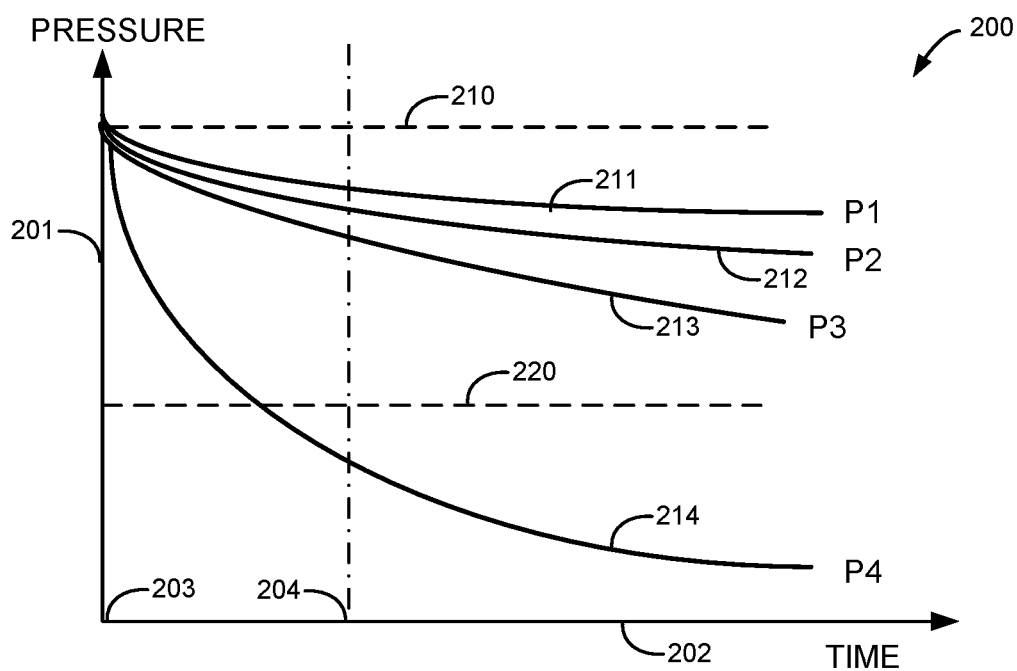
FIG. 2 illustrates a graph showing various pressure measurements in accordance with embodiments of the disclosure.

FIG. 2 illustrates a graph 200 showing various pressure measurements in accordance with embodiments of the present disclosure. Graph 200 includes a vertical axis 201 representing increasing levels of pressure in the upward direction, and a horizontal axis 202 representing time. The positional location of vertical axis 201 relative to the time axis 202 represent time(0) indicated by reference number 203. Time(0) may represent a time during an automatic pressure testing procedure wherein a pressure level, represented by dashed line 210, has been reached within one or more portions of a frac iron configuration, such as the frac iron configuration illustrated and described with respect to FIG. 1.

Referring back to FIG. 2, graphical line 211 represents a first measured pressure level P1, measured at a first location within the frac iron configuration, and illustrates a pressure drop occurring over time with respect to pressure level P1. Graphical line 212 represents a second measured pressure level P2, measured at a second location within the frac iron configuration, and illustrates a pressure drop occurring over time with respect to pressure level P2. Graphical line 213 represents a third measured pressure level P3, measured at a third location within the frac iron configuration, and illustrates a pressure drop occurring over time with respect to pressure level P3. Graphical line 214 represents a fourth measured pressure level P4, measured at a fourth location within the frac iron configuration, and illustrates a pressure drop occurring over time with respect to pressure level P4. The pressure values represented by graphical lines 211, 212, 213, and 214 may include measured pressure levels occurring over an evaluation time period represented by the time period extending between time(0) and an expiration time represented by dashed line 204.

In some embodiments, a determination may be made based on the pressure values represented by each individual graphical line 211, 212, 213, 214 as to whether a leak has been detected within the frac iron configuration being pressure tested. By way of non-limiting example, the graphical line 214 representing pressure values associated with pressure P4 drops below a threshold pressure level represented by dashed line 220 before the expiration of the evaluation time period ending at the expiration time represented by dashed line 204. Because of the amount of bleed off in the pressure value represented by P4 occurring within the designated evaluation time period, the portion of the frac iron configuration represented by the pressure level of P4 may be determined to have a "leak" present. With respect to the pressure values P1, P2, and P3 as represented by graphical lines 211, 212, and 213, respectively, the indication of maintaining a minimum pressure level relative to a pressure level represented by dashed line 210 and above dashed line 220 over the evaluation time period may be interpreted as indication that a "leak" is not detected in any of the locations of the frac iron configuration represented by the pressure levels P1, P2, and P3. In various example, each of the pressure values represented by graphical lines 211, 212, 213, and 214 may be evaluated against a same threshold pressure value, such as the pressure threshold value represented by dashed line 220. In other embodiments, each of the pressure values represented by pressure levels P1, P2, P3, and P4 may be evaluated using a different pressure threshold level that may be assigned, respectively, to be used to evaluate each of these pressure levels individually. Alternatively, the pressure values represented by the pressure levels P1, P2, P3, and P4 may be mathematically combined together in order to make a combined value for evaluation. For example, the combined value may be the averaged pressure, the range of pressures, the maximum pressure value, the minimum pressure value, or the standard deviation of the pressure values.

A determination of the presence of a leak based on the curves represented by graphical lines 211, 212, 213, and 214 is not limited it any particular method or technique, including not being limited to a comparison of the pressure values represented by the graphical curves to one or more predefined pressure threshold levels, and may be based on any method and/or technique that may be useful for evaluation of these pressure measurements in order to determine whether a leak is being detected within the frac iron configuration.

Figure 3:
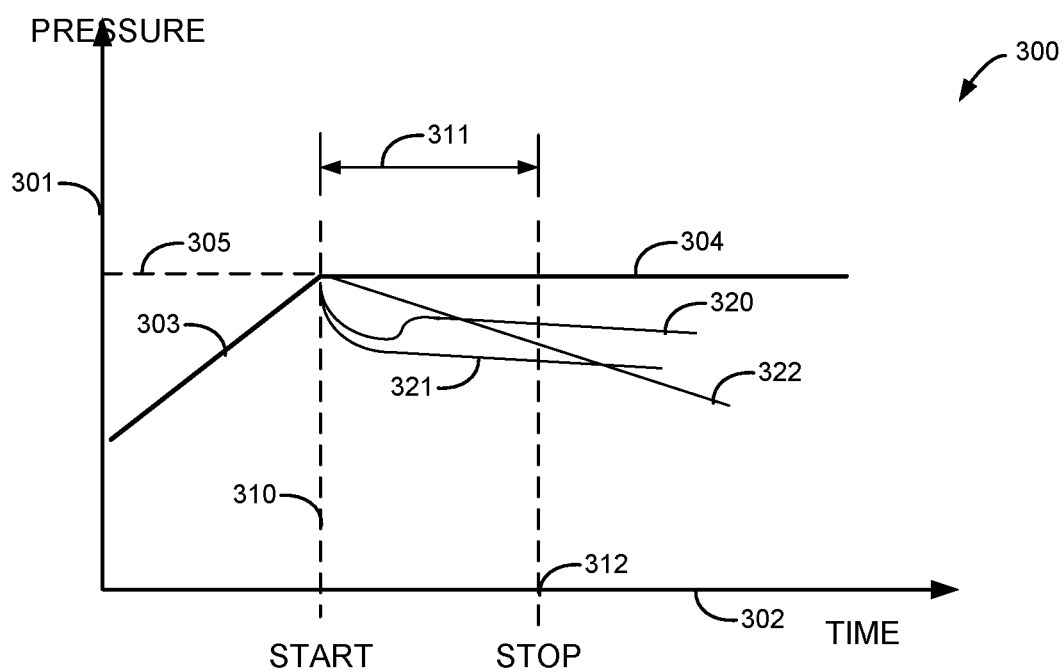
FIG. 3 illustrates a graph showing various pressure measurements in accordance with embodiments of the disclosure.

FIG. 3 illustrates a graph 300 showing various pressure measurements in accordance with embodiments of the disclosure. Graph 300 includes a vertical axis 301 representing increasing levels of pressure in the upward direction, and a horizontal axis 302 representing time. Graphical line 303 represents a pressure level over time that increased to a predefined pressure level represented by horizontal dashed line 305. At time(0) represented by vertical dashed line 310, the pressure level represented by graphical line 303 has reached the pressure level represented by horizontal dashed line 305. Beginning at time(0) an evaluation time period 311, extending from time(0) to time(1) (as represented by vertical dashed line 312), expires at time t(1). Over the evaluation time period 311, pressure levels of various pressures present within a frac iron configuration may be monitored, and the data collected from the monitored pressure measurements may be further processed to generate curves 320, 321, and 322. The horizontal line 304 represents an ideal pressure level that would be maintained after pressurization of a frac iron configuration which has no level of fluid pressure leakage, and further ignoring any variations in pressure levels due to other factors such as fluid compression and stretching of the devices included in the pressurized portions of the frac iron configuration due to the fluid pressure, among other factors.

Curves 320, 321, and 322 are generated to depict a change in the slope of the bleed-off pressures within one or within multiple portions of the frac iron configuration. The change in the slope may help to identify the type of behavior that is causing the pressure bleed. For example, a leak in a connection may be characterized by a quadratic pressure loss that persists over time. Compressibility or stretch in the tubing used to form the frac iron may be characterized by a more rapid change that quickly equalizes. Air in the lines may cause rapid pressure changes but will equalize more rapidly than a tubing leak. The size of the leak may also be estimated from the pressure change as well as other parameters of the pump operation. Knowing the size of the leak can help guide identifying the location of the leak. If pressure bleed-off attributed to tubing compressibility exceeds an expected value, an output signal to alert an operator may be provided. In some embodiments, the output signal can include an indication that a wall thickness of the tubing within some portion of the frac iron configuration has been diminished either due to erosion or to corrosion. If the wall thickness of the tubing is reduced, then more stretch will be encountered. A reduced wall thickness is also a sign of reduced pipe life. Any of these issues may be detected by the automatic pressure testing procedures described in the disclosure, and may be brought to the attention of an operator for further review and evaluation for repair.

As illustrated in graph 300, curve 320 may be characteristic of gas, such as air, compressing in the system. Curve 321 may be characteristic of stretching of the tubing of the frac iron configuration. Curve 322 may be characteristic of a pressure leak in the frac iron configuration. The ability to generate curves such as curve 320, 321, and 322 based on pressure level measurements may allow a computing system and/or an operator viewing the data to further determine the types, the location, and/or the severity of the causes for pressure level bleed off within the frac iron configuration.

Figure 4:
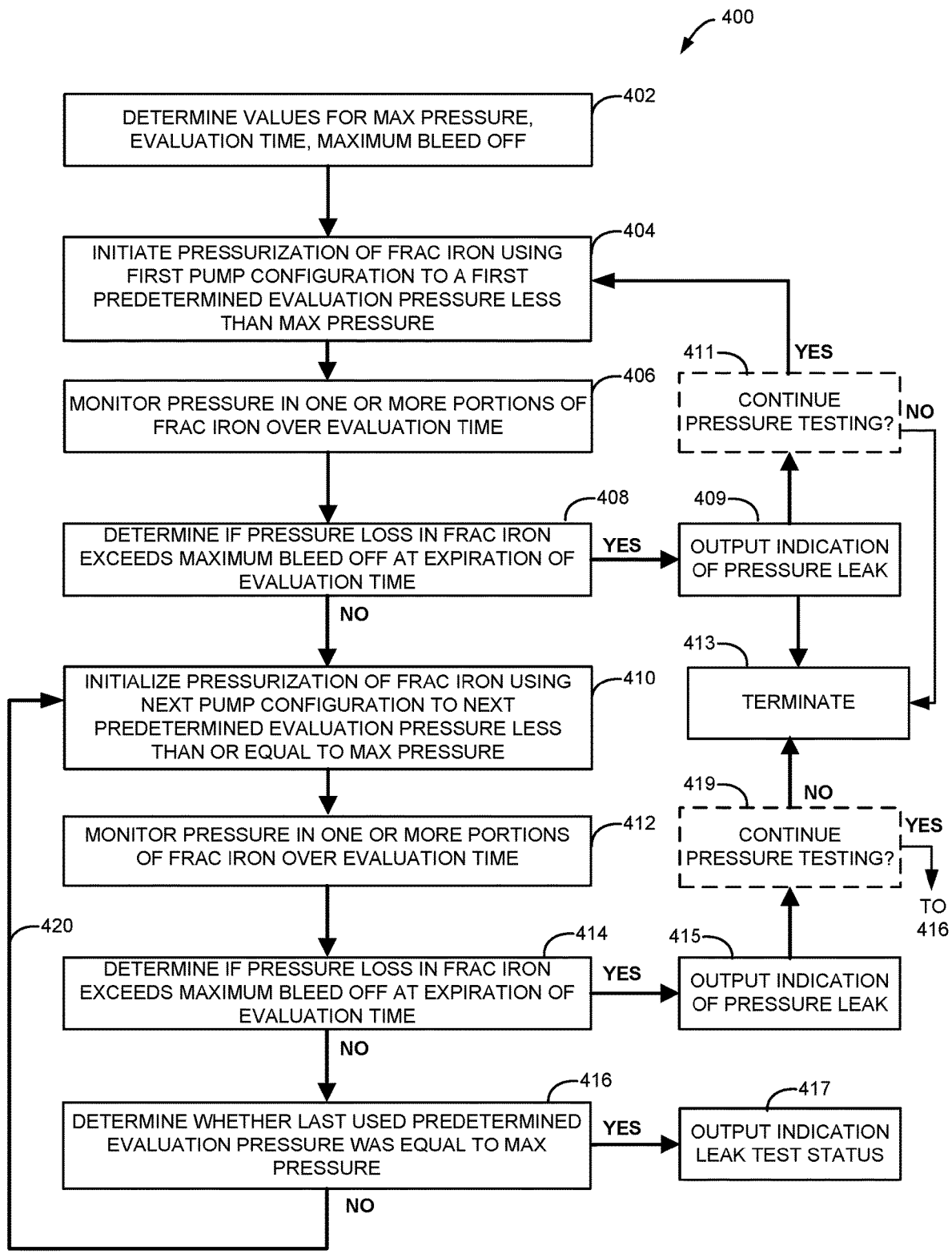
FIG. 4 illustrates a flowchart of an example method according to various embodiments of the disclosure.

FIG. 4 illustrates a flowchart of an example method 400 according to various embodiments of the disclosure. In various embodiments, method 400 may be performed by a computer system, such as but not limited to computer system 151 as illustrated and described with respect to FIG. 1. In various embodiments, one or more processors, such as but not limited to processor 152 of computer system 151 (FIG. 1), may perform computing operations that control and/or perform some, all, or any combination of the processes described with respect to method 400, and any equivalents thereof.

Method 400 includes determining values for a Pmax maximum pressure, and values for at least one evaluation time period and at least one maximum bleed off pressure threshold associated with at least one evaluation time period (block 402). Method 400 includes initiating pressurization of a frac iron configuration using a first pump configuration (block 404). In various embodiments, the processor is configured to provide control outputs to a first set of pumps (for example, pumps 110, 111, 112, 115, FIG. 1) coupled to the frac iron configuration to control the first set of pumps to provide fluid pressure to the frac iron configuration. Based on the control outputs provided by the processor, the first set of pumps pressurize the frac iron configuration to a first predetermined evaluation pressure. In various embodiments, the first predetermined evaluation pressure is a pressure value that is less than the Pmax pressure value. One or more pressure sensor (for example, pressure sensors 125, 126, 127, 128, 129, FIG. 1), are coupled to the frac iron configuration and are configured to measure pressure levels at one or more locations within the frac iron configuration. The one or more pressure sensors are further configured to provide outputs, such as electrical signals, to the processor controlling the first pump configuration. Based on the outputs provided by the pressure sensors, the processor controlling the first pump configuration may stop the first pump configuration from further pressurizing the frac iron configuration once the first predetermined evaluation pressure has been reached within the frac iron configuration. In some embodiments, the pumps included in the first pump configuration may be stopped, while also preventing any pressure from the fluid within the frac iron configuration from backflowing or being otherwise received through the pump itself.

Once the first predetermined evaluation pressure has been achieved within the frac iron configuration, the processor may initiate a timer configured to time an evaluation time period associated whit the first predetermined evaluation pressure. For example, once the first predetermined evaluation pressure is achieved within the frac iron, the processor starts an evaluation time period having a predetermined length of time, for example but not limited to a predefined number of seconds or minutes. During the first evaluation time period, the processor monitors, for example via signals received from the one or more pressure sensors, a pressure level within one or more portions of the frac iron configuration (block 406). At the end of the first evaluation time period, the processor determines if any pressure loss within the frac iron configuration that occurred over the evaluation time period has exceeded the value for the maximum bleed off threshold value associated with the first evaluation time period (block 408).

In various embodiments of method 400, a determination that the pressure loss in the frac iron configuration over the first evaluation time period has exceeded the value of the maximum bleed off threshold value, (YES arrow extending from block 408 in FIG. 4), includes the processor outputting an indication, such an electronic output signal to generate an visual display on a display device (for example display 154, FIG. 1) indicating that a pressure leak has been detected (block 409). In various embodiments, in addition to providing an output indicating that a leak has been detected, the processor also outputs a request for further instructions regarding whether the automatic pressure testing procedure is to be continued or terminated (block 411). The processor may receive an input from a system operator, indicating that the automatic pressure testing process is to be continued, in some examples following a further diagnosis and/or repair of the detected leak by a technician (YES arrow extending from block 411). If the processor receives an input the indicates that the automatic pressure testing process is to be continued, method returns to performing an initial pressurization of the frac iron at block 404. Otherwise, when no instruction is received, or when a specific instruction is received at the processor to terminate the automatic pressure testing process, (NO arrow extending from block 411), the processor terminates the automatic pressure testing process (block 413). Termination of the automatic pressure testing process may include depressurization, for example by opening the frac iron configuration to the well bore, of the existing pressure present in the frac iron configuration.

Returning to block 408 of method 400, if no leak is detected as a result of the initial pressurization of the frac iron (NO arrow extending from block 408), method 400 includes initiating pressurization of a frac iron configuration using a next pump configuration (block 410). In various embodiments, the processor is configured to provide control outputs to a set of pumps (for example, one or more of pumps 110, 111, 112, 115, FIG. 1) coupled to the frac iron configuration to control the pumps included in the next pump configuration to provide fluid pressure to the frac iron configuration. In some embodiments, the next pump configuration includes a smaller number of pumps as was included in the first pump configuration. In some embodiments, the next pump configuration includes configuring the horsepower settings of the pumps included in the next pump configuration to one or more different horsepower settings as was used to configure the horsepower setting utilized by the pumps included in the first pump configuration. In various embodiment, some combination of the number of pumps and the horsepower settings used to configure the pumps included in the next pump configuration is different from the number of pumps and/or the horsepower settings used to configure the pumps included in the first pump configuration.

Based on the control outputs provided by the processor, the pumps included in and configured according to the next pump configuration are operated to pressurize the frac iron configuration to the next predetermined evaluation pressure (block 410). In various embodiments, the next predetermined evaluation pressure is a pressure value that is less than the Pmax pressure value. In various embodiments, the next predetermined evaluation pressure value is the Pmax maximum pressure. Based on the outputs provided by the pressure sensors, the processor controlling the next pump configuration may stop the pumps included in the next pump configuration from further pressurizing the frac iron configuration once the next predetermined evaluation pressure has been reached within the frac iron configuration. In some embodiments, the pumps included in the next pump configuration may be stopped, while also preventing any pressure from the fluid within the frac iron configuration from backflowing or being otherwise received through the pump itself.

Once the next predetermined evaluation pressure has been achieved within the frac iron configuration, the processor may initiate a timer configured to time an evaluation time period associated whit the next predetermined evaluation pressure. For example, once the next predetermined evaluation pressure is achieved within the frac iron, the processor starts an evaluation time period having a predetermined length of time, for example but not limited to a predefined number of seconds or minutes. The length of the evaluation time period may be shorter, longer, or the same time period as was used in the first evaluation time period. During the next evaluation time period, the processor monitors, for example via signals received from the one or more pressure sensors, a pressure level within one or more portions of the frac iron configuration (block 412). At the end of the next evaluation time period, the processor determines if a pressure loss within the frac iron configuration that occurred over the evaluation time period has exceeded the threshold value for the maximum bleed off associated with the next evaluation time period (block 414).

In various embodiments of method 400, a determination that the pressure loss in the frac iron configuration over the next evaluation time period has exceeded the threshold value of the max bleed off (YES arrow extending from block 414), includes the processor outputting an indication, such an electronic output signal to generate an visual display on a display device (for example display 154, FIG. 1) indicating that a pressure leak has been detected (block 415). In various embodiments, in addition to providing an output indicating that a leak has been detected, the processor also outputs a request for further instructions regarding whether the automatic pressure testing procedure is to be continued or terminated (block 419). The processor may receive an input from a system operator indicating that the automatic pressure testing process is to be continued, in some examples following a further diagnosis and/or repair of the detected leak, by a technician (YES arrow extending from block 419). If the processor receives an input the indicates that the automatic pressure testing process is to be continued, method 400 proceeds to block 416. Otherwise, when no instruction is received, or a specific instruction is received at the processor to terminate the automatic pressure testing process, (NO arrow extending from block 419), the processor terminates the automatic pressure testing process (block 413).

Returning to block 414 of method 400, if no leak is detected as a result of the next pressurization of the frac iron (NO arrow extending from block 414), method 400 proceeds to block 416. At block 416, the processor determines whether the last used predetermined evaluation pressure was equal to the maximum pressure level. If the last used predetermined evaluation pressure level was equal to the maximum pressure level (YES arrow extending from block 416), method 400 proceeds to block 417, wherein the processor outputs an indication of the PASS/FAIL status resulting from the automatic pressure testing procedure. At block 417, when the processor determines that no leak was detected as a result of the pressure testing cycle performed using the maximum evaluation pressure, the process assigns and outputs a status indication of "PASS" for the frac iron configuration. In the alternative, when the processor determines that at least one leak was detected as a result of the pressure testing cycle performed using the maximum evaluation pressure, the process assigns and outputs a status indication of "FAIL" for the frac iron configuration.

Returning to block 416 of method 400, if the last used predetermined evaluation pressure was not equal to the maximum pressure level (NO arrow extending from block 416), method 400 proceeds to block 410 via return connector 420, wherein the processor initializes another pressurization of the frac iron configuration. When proceeding to block 410 from block 416, the reference to the next pump configuration includes another pump configuration that may be the same or a different pump configuration compared to any of the previously used pump configurations. For example, the next pump configuration that will be operated to pressurize the frac iron may include a smaller number of pumps and/or different horsepower settings utilized in this next pump configuration comparted to any of the pump configuration previously used in the particular automatic pressure test procedure.

Further, the next predetermined evaluation pressure may be a pressure level that is higher than any evaluation pressure level use in any previously performed pressure testing cycles applied to the frac iron as part the automatic pressure testing procedure that is current being performed by the processor. In addition, the time period utilized as the next evaluation time period may be a time period that is shorter, longer, or the same as the evaluation time period utilized to perform any of the pressure testing cycles applied to the frac iron as part the automatic pressure testing procedure that is currently being performed by the processor. Each of the pressure testing cycles initiated at block 410 may proceed to block 412 including monitoring the pressure in one or more portions of the frac iron over the evaluation time period being utilized for that particular pressure testing cycle, and to block 414 including determining if a pressure loss in the frac iron exceeds the maximum blood off pressure value at the expiration of the evaluation time period. If a leak is detected as a result of the pressure testing cycle, method 400 proceeds to block 415, and if no leak is detected, method 400 may proceed to block 416 in a same or similar manner as described above.

As illustrated, there is no limit to the number of pressure testing cycles that may be performed by method 400 utilizing the method steps of blocks 410, 412, 414, and 416. The pressure testing cycle may be repeated, in some embodiments using an increasingly higher evaluation pressure level for each successive pressure testing cycle, until either a leak is detected and the automatic pressure testing procedure is terminated, or a pressure testing cycle is performed at the final and highest pressurization level set for the automatic pressure testing procedure currently being performed.

Variations of method 400 include determining if a leak is detected at the expiration of the evaluation time period (block 408 or block 414) using one or more criteria other than or in addition to determination that the pressure bleed off exceeded a maximum bleed off value. For example, any criteria and any technique described herein or otherwise useful in determining if a leak is present based on the monitored pressure levels may be employed by method 400 at block 408 and/or at block 414 to determine if a leak or leaks were detected, or if no leaks were detected as a result to the most recent pressure testing calycle performed by the processor as part the automatic pressure testing procedure.

FIG. 5 illustrates a block diagram of an example computing system 500 that may be employed to practice the concepts, methods, and techniques disclosed herein, and variations thereof. The computing system 500 includes a plurality of components of the system that are in electrical communication with each other, in some examples using a bus 503. The computing system 500 may include any suitable computer, controller, or data processing apparatus capable of being programmed to carry out the method and apparatus as further described herein. In various example, one or more components illustrated and described with respect to computing system 500 may be included in computing system 151 as illustrated and described with respect to FIG. 1.

Referring back to FIG. 5, computing system 500 may be a general-purpose computer, and includes a processor 501 (possibly including multiple processors, multiple cores, multiple nodes, and/or implementing multi-threading, etc.). The computer includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the possible realizations of machine-readable media. The computer system also includes the bus 503 (e.g., PCI, ISA, PCI-Express, HyperTransport® bus, InfiniBand® bus, NuBus, etc.) and a network interface 505 (e.g., a Fiber Channel interface, an Ethernet interface, an internet small computer system interface, SONET interface, wireless interface, etc.).

The computer may also include an image processor 511 and a controller 515. The controller 515 can control the different operations that can occur in the response inputs from sensors 519 and/or calculations based on inputs from sensors 519 (such as sensors 125, 126, 127, 128, 129 of pressure test system 100, FIG. 1) using any of the techniques described herein, and any equivalents thereof, to provide outputs to control pumps/valves 521. For example, the controller 515 can communicate instructions to the appropriate equipment, devices, etc. to alter control number and/or the horsepower setting use by pumps, (such as pumps 110, 111, 112, 115, FIG. 1) and/or to set and control valves (such as valves 136, 137, 138, 139, 143, and 144 as illustrated in FIG. 1) that may be utilized in an automatic pressure testing procedure. Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). As illustrated in FIG. 5, the processor 501 and the network interface 505 are coupled to the bus 503. Although illustrated as also being coupled to the bus 503, the memory 507 may be coupled to the processor 501 only, or both processor 501 and bus 503.

Controller 515 may be coupled to sensors 519 and to pumps/valves 521 using any type of wired or wireless connection(s), and may receive data, such as measurement data, obtained by sensors 519 or provided by the pumps/valves 521. Sensors 519 may include any of the sensors associated with a wellbore environment, including but not limited to the pressure sensors configured to output signals indicative of pressure level within a frac iron configuration. Measurement data may include any of the data associated with an automatic pressure testing procedure. Controller 515 may include circuitry, such as analog-to-digital (A/D) converters and buffers that allow controller 515 to receive electrical signals directly from one or more of sensors 519.

Processor 501 may be configured to execute instruction that provide control over an automatic pressure testing procedure as described in this disclosure, and any equivalents thereof. For example, processor 501 may control operations of one or more pumps being utilized to pressurize a frac iron configuration as part of an automatic pressure testing procedure. Control of pumps may include determining a set of predefined pump configurations, wherein a particular one of the predefined pump configurations are assigned to be used during each of a plurality of pressure testing cycles, and providing output signal, for example to controller(s) located at the pumps, to configure and control the operations of the pumps at each pressure testing cycle according to the predefined pump configuration that is to be applied to that particular pressure testing cycle. Processor 501 may also be configured to receive output signals generated by the sensor 519, to process the signals to generate pressure level data, and to utilize that pressure level data to determine if a leak or leaks have been detected as a result of the pressure testing procedure. Processor 501 may also be configured to support any interaction between a system user and computer system 500, including generating for display output information related to the results obtained from running an automatic pressure testing procedure on a frac iron configuration, and receive and process inputs provide by a system user to computer system 500, for example regarding how to proceed with the automatic pressure testing procedure when leaks are detected by the procedure.

With respect to computing system 500, basic features here may easily be substituted for improved hardware or firmware arrangements as they are developed. In some examples, memory 507 includes non-volatile memory and can be a hard disk or other types of computer readable media which can store data that are accessible by a computer, such as magnetic cassettes, flash memory cards, solid state memory devices, digital versatile disks (DVDs), cartridges, RAM, ROM, a cable containing a bit stream, and hybrids thereof.

It will be understood that one or more blocks of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus. As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine. While depicted as a computing system 400 or as a general purpose computer, some embodiments can be any type of device or apparatus to perform operations described herein.

Figure 6:
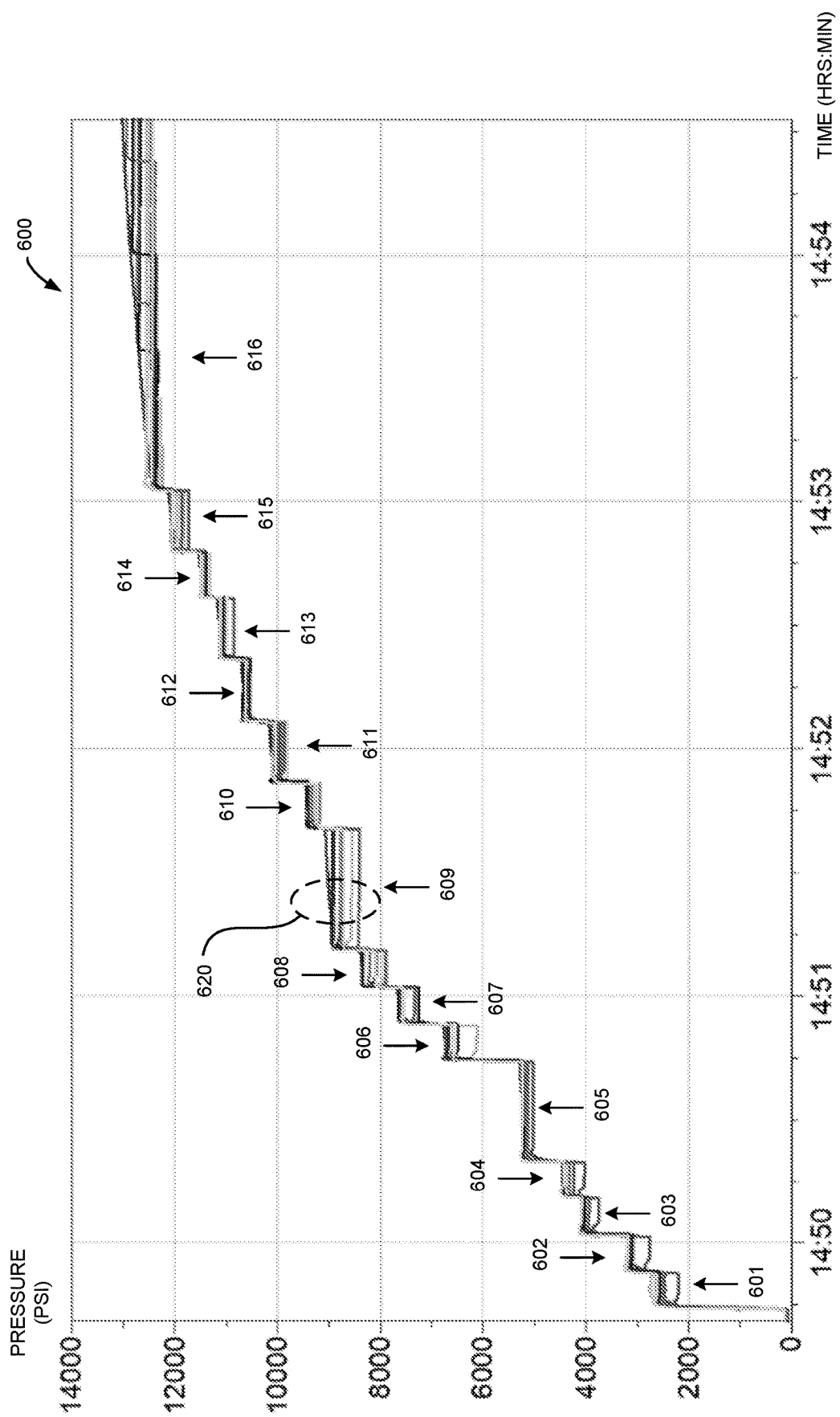
FIG. 6 illustrates a graph showing actual pressure level measurements taken during an automatic pressure testing procedure performed in accordance with embodiments of the present disclosure.

FIG. 6 illustrates a graph 600 showing actual pressure level measurements taken during an automatic pressure testing process performed in accordance with embodiments of the present disclosure. Graph 600 includes a vertical axis representing pressure levels in pounds/square inch, and a horizontal axis representing time in hours:minutes. Graph 600 also includes a set of curves 620, represented by the curves extending through the dashed ellipse that encircles a portion of each of curves 620. The path of each of the curves included in cures 620 represents measured pressure levels for a particular portion of a frac iron configuration that was monitored for pressure level within the frac iron during an automatic pressure testing procedure that was performed on the frac iron.

As illustrated in graph 600, each of curves 620 includes an upward vertical orientation of the curve line indicating a pressure increase, followed by a relatively flat extension of the curves for some period of time, followed in time by a subsequent upward movement indicating another pressure increase, followed by another relatively flat extension of the curves 620 in a horizontal orientation. For example, initially curves 620 illustrate a pressure increase from about zero pounds/square inch (PSI) to a pressure value somewhere above 2000 PSI. This increase in pressure is followed by a period of time, generally indicated by arrow 601, wherein curves 620 maintain a generally horizontal orientation. This increase in pressure followed by the generally horizontal orientation of the curves represent an initial pressure testing cycle, where a frac iron configure was initially pressurized to the pressure value just above 2000 PSI, followed by an evaluation time period represented by the time generally indicated by arrow 601 where curves 620 have a generally horizontal orientation.

Following the evaluation time period generally indicated by arrow 601, curves 620 again illustrate a vertical orientation, representing a next pressurization to a pressure level at or near 3000 PSI. Following this next pressurization, curves 620 illustrate a generally horizontal orientation representing another (next) pressure testing cycle, wherein the frac iron configuration was pressurized to the pressure value of about 3000 PSI, followed by the evaluation time period generally indicated by arrow 602. This pattern of increased pressurization followed by an evaluation time period is repeated, as represented by the portions of curves 620 generally indicated by arrow 601-615 representing individual pressure testing cycles performed on the frac iron configuration. As shown by the illustration of curves 620, the increase in the pressure level between any pressure testing cycle and the subsequent pressure testing cycle does not have to be a same level of pressure increase. For example, the pressure level increase between the pressure testing cycles 605 and 606 appears to be larger than the pressure level increases between other pressure testing cycles illustrated in graph 600. In addition, the evaluation time period for any given one of the pressure test cycle generally represented by arrow 601-615 varies in length, and may not be the same time period for prior or subsequent cycles, or for each of the other the pressure test cycles, By way of example, the evaluation time period associated with the pressure testing cycles generally represented by arrows 605 and 609 appears to be a longer time period compared to the evaluation time periods sued for other pressure testing cycles represented in graph 600.

In the pressure test cycle generally represented by arrow 616, the frac iron configuration was pressurized to a final pressure level in a range between 12,000 and 13,000 PSI. In performing the pressure testing cycles, the pump configurations used to provide the pressure level increases was modified through the automatic pressure testing procedure to allow for the incremental increased illustrated by curves 620, which eventually allow for the final pressurization of the system at arrow 616. Variations in the pump configurations used during the automated pressure testing process illustrated in graph 600 include using combinations of all available pumps, group of pumps and/or a single pump. Pressure is gradually increased up to test pressure while monitoring for pump leak off and overall system leak off. In this configuration a total number of 10 pumps each capable of 2000 horsepower was used. All pumps were used for some duration of pressure testing and individual pumps were used in other duration determined by control system at each point. These variations illustrate possible embodiments of the systems, apparatus, methods and techniques that may be utilized by the automatic pressure testing procedures described throughout this disclosure, and any equivalents thereof.

Figure 7:
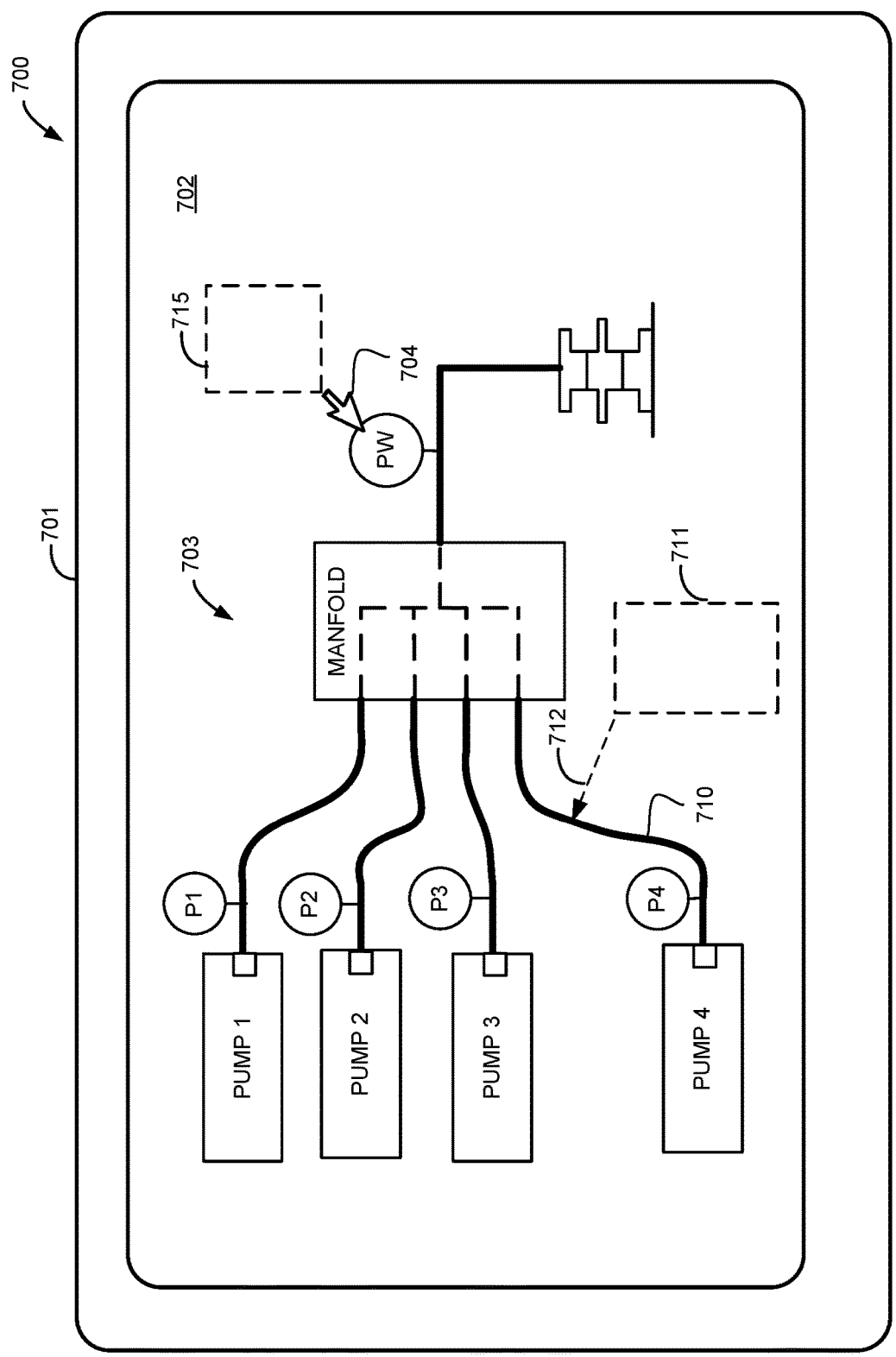
FIG. 7 illustrates an embodiment of a display device configured to provide a graphical user interface in accordance with various embodiments of the disclosure.

FIG. 7 illustrates an example of a display device 700 configured to provide a graphical user interface 703 in accordance with various embodiments of the present disclosure. Display device 700 includes a display 701, such as a computer monitor, including a display area 702, such as a display screen, configured to provide a graphical depiction of a frac iron configuration within graphical user interface. As shown in FIG. 7, the frac iron configuration is the same as or similar to a portion of frac iron configuration included in system 100 of FIG. 1. However, the graphical depiction provided by graphical user interface 703 is not limited to a display of any particular frac iron configuration, and in various embodiments is generated by an image processor, such as image processor 511 illustrated and described with respect to FIG. 5, and displayed by display device 700 to depict a particular frac iron configuration of interest.

As illustrated in FIG. 7, the depiction of the frac iron configuration displayed within display area 702 includes a graphical depiction of pump 1, pump 2, pump 3, and pump 4, a manifold, and a choke or shutoff value, along with flow path devices, such as pipes, which interconnect the pumps, the manifold, and the choke valve. In some embodiments, various pressure sensors, such as P1, P2, P3, P4, and PW may also be graphically depicted as part of display being provided by graphical user interface 703.

In various embodiments, as part of performing an automatic pressure testing on a frac iron configuration, real time information, such as but not limited to indications of the detection of a leak in the frac iron configuration, may be represented graphically by graphical user interface 703. For example, during an automatic leak test procedure, a determination may be made that a leak was detected on pipeline 710 extending between pump 4 and the manifold. In response, graphical user interface may provide some type of visual indication of the detection of the leak. For example, the graphical depiction within graphical user interface 703 representing pipeline 710 may be rendered in a particular color, such as red, and/or may be made to flash in an ON/OFF pattern, to draw attention to the indication of the detection of a leak. In various embodiments, when a leak is detected as part of an automatic pressure testing procedure, a pop up box, such as box 711, may appear as part of the graphical depiction being provided by graphical user interface 703. Box 711 may provide additional information, such as time and pressure information, related to the detected leak. Box 711 in some examples may include a pointer 712 that points to the graphical depiction of the portion or the device within the frac iron configuration where the leak or other issue may have been detected. In various embodiments, box 711 may provide an interactive medium, configured so that a system user, such as a technician, an operator, or an engineer, can provide inputs to the pressure test system communicatively coupled to the graphical user interface 703 regarding how the system and the automatic pressure testing procedure is/are to proceed in view of the detection of the leak within the frac iron.

For example, box 711 may ask for operator input(s) as to whether the automatic pressure testing procedure should be terminated. In other examples, box 711 may ask for operator input(s) indicating whether to continue the automatic pressure testing procedure, and for example if the portion of the frac iron configuration where the leak was detected should be isolated from one or more additional portions of the frac iron configuration, or whether the portion of the frac iron configuration where the leak was detected could continue to be part of the frac iron configuration being pressure tested.

The methods to provide operator inputs to graphical user interface are not limited to any particular method or any particular combination of methods, and may including any method or combination of methods known to be used to provide inputs to a computer system. For example, the display area 702 may provide graphical user interface 703 on a touch screen that allows a system user to input information to the graphical user interface 703 by touches, for example using the system user's finger or by using a stencil pen. In other examples, inputs to the graphical user interface may be provided by any I/O device, such as a keyboard or a computer mouse, for example as depicted I/O device 153 as illustrated and describe with respect to FIG. 1.

Referring back to FIG. 7, when inputs are received at graphical user interface 703, graphical user interface may be configured to provide signals to a processor (such as processor 152 as illustrated and described with respect to FIG. 1) for further control of the automatic pressure testing procedure based on the user inputs. A user controllable cursor 704 may be provided as part of graphical user interface 703. User controllable cursor 704 may be configured to be controllable using user inputs, for example provided by a computer mouse communicatively coupled to graphical user interface 703. In various embodiment, user controllable cursor 704 may be positioned at or near one of the items, such as a pump, manifold, pump line, or pressure sensor that is being graphically depicted within graphical user interface 703 and selected. Upon selection of one of the items using the user controllable cursor, a pop-up box, such as box 715, may be generated and displayed as part of graphical user interface 703. Information may be depicted, such as text and or symbols, within box 715 associated with the selected item. For example, using user controllable cursor 704 to provide an indication of the selection of the graphical symbol representing sensor PW within graphical user interface 703, box 715 may appear within the graphical user interface and may include text, symbols, and other depictions of conveying information related to sensor, such as but not limited to real-time pressure values. The type of information included in the box 715 is not limed to any particular type of information, and may be determined to include information relevant to and that would be of interest to a system user that for the item that was selected.

Figure 8:
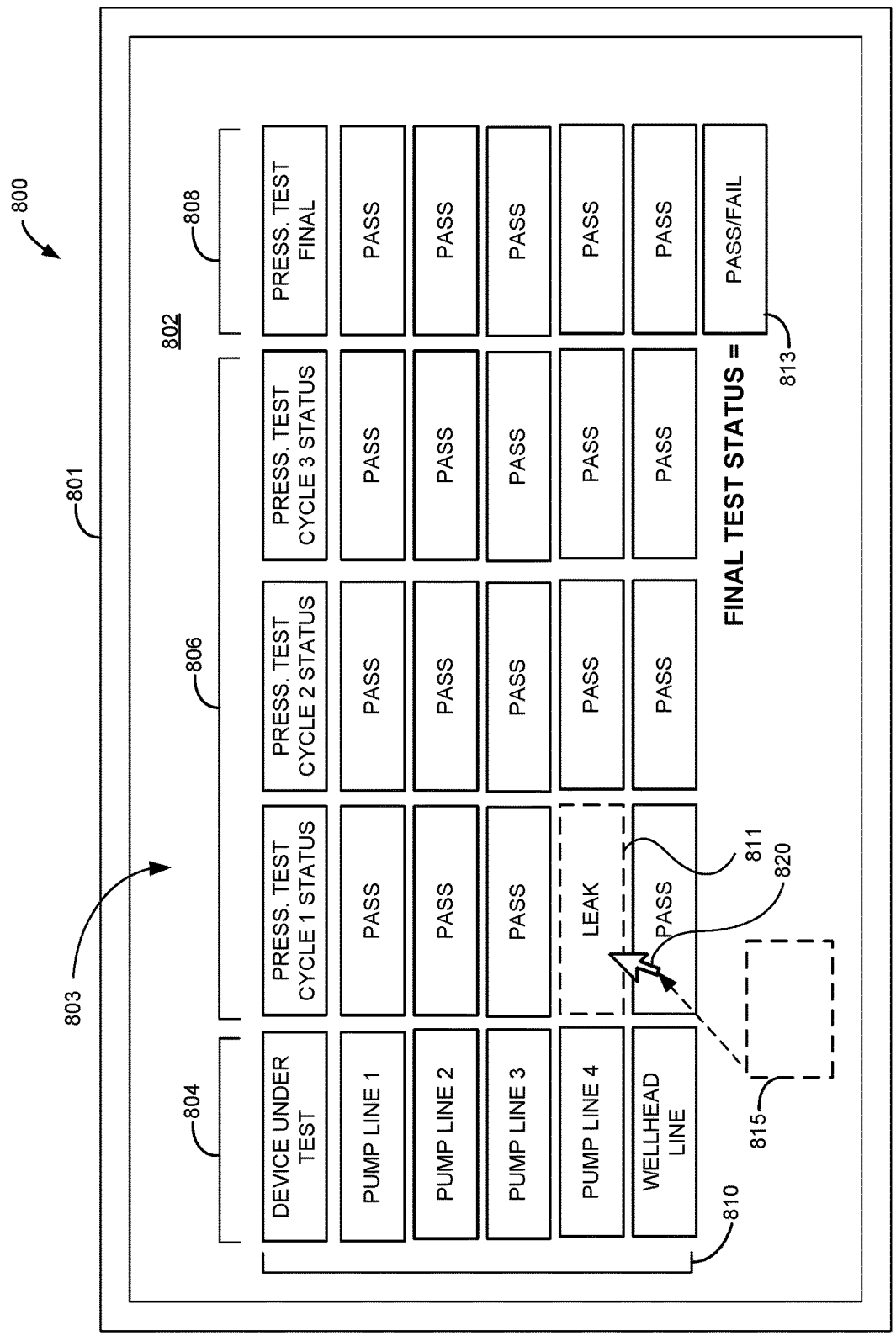
FIG. 8 illustrates an embodiment of a display device configured to provide a graphical user interface in accordance with various embodiments of the disclosure.

FIG. 8 illustrates an embodiment of a display device 800 configured to provide a graphical user interface in accordance with various embodiments of the disclosure. Display device 800 includes a display 801, such as a computer monitor, including a display area 802, such as a display screen, configured to display a graphical user interface 803. As shown in FIG. 8, graphical user interface 803 includes tabular information arranged in rows and columns, and depicting various type of information associated with an automatic pressure testing process. The column below bracket 804 includes a set of tabs, each tab representing a device included in a frac iron configuration being represented by the graphical user interface 803. Each tab representing a device, such a pump line 1, pump line 2, pump line 3, pump line 4 and a wellhead line, are arranged in a vertically stacked rows, generally represented by bracket 810. Columns included within graphical user interface 803 also include three sets of vertically stacked tabs, generally positioned below bracket 806, and including information related to pressure testing cycle 1, pressure testing cycle 2, and pressure testing cycle 3, respectively. The information included within each of the tabs positioned below bracket 806 may include any information such as "PASS" or "LEAK" that is indicative of the status determine for the particular pressure testing cycle and the particular device associated with the row where the respective tab is located.

As an example, tab 811 is located under the column representing status determined for devices as a result of pressure testing cycle 1, and in the row related to the device associated with pump line 4. As indicated by tab 811, a status of "LEAK" was determined for cycle 1 pressure testing of pump line 4, and so the text "LEAK" is graphical depicted within tab 811. Other tabs within columns below bracket 806 include a text "PASS" indicating that these devices were determined to not have a detected leak as part of the respect pressure testing cycle where the tab appears.

In addition, columns of vertically stacked tabs appear below bracket 808. The column below bracket 808 includes tabs having graphical depictions of the status determined for the devices including in the rows indicated by bracket 810 during the final pressure testing procedure. In some embodiments the final pressure testing procedure includes a pressure testing procedure performed at the Pmax maximum pressure rating for the frac iron configuration being tested. In some embodiments, graphical user interface 803 may include tab 813 located at the bottom of the vertical stack of tabs located under bracket 808. As status indication of "PASS" or "FAIL" may be provided within tab 813 as an overall indication of "FINAL TEST STATUS" determined for the entirety of the devices including in the pressure testing cycles of the frac iron configuration on which the pressure testing depicted in graphical user interface 803 was performed.

Graphical user interface 803 may be an interactive graphical user interface, wherein a system user may provide inputs to the graphical user interface 803, or another I/O device communicatively coupled to graphical user interface 803, in order to interact with and control the information being provided through the graphical user interface. For example, graphical user interface may include a user controllable cursor 820. In any manner described above with respect to cursor 704 and FIG. 7, user controllable cursor 820 as shown in FIG. 8 may be manipulated by user inputs to provide selections of various components, for example the tabs, as provided by graphical user interface 803. Upon selection of for example a tab within graphical user interfaced 803, addition information associated with the selected item, for example in the form of a pop-up box such as box 815, may appear within the graphical user interface. Box 815 may provide text, symbols, or other graphical depictions may be provided including additional information related to the selected item.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

While the aspects of the disclosure are described with reference to various implementations and exploitations, it will be understood that these aspects are illustrative and that the scope of the claims is not limited to them. In general, techniques for automatically pressure testing frac iron described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example embodiments include the following.

Embodiment 1. A method comprising: performing automatically a plurality of pressure testing cycles on a frac iron configuration, each of the pressure testing cycles comprising: pressurizing the frac iron configuration with a fluid using a predefined pump configuration to generate a predetermined evaluation pressure level within the frac iron configuration, monitoring one or more measured pressures within the frac iron configuration at one or more times during an evaluation time period beginning once the predetermined evaluation pressure level within the frac iron configuration has been reached, and determining whether a pressure loss in the frac iron configuration indicates detection of a leak based on the one or more measured pressures.

Embodiment 2. The method of embodiment 1, further comprising: generating an indication of a detection of a leak in the frac iron configuration in response to a determination that the pressure loss in the frac iron configuration exceeds a maximum bleed off threshold value during any of the pressure testing cycles.

Embodiment 3. The method of embodiments 1 or 2, wherein a given one of the plurality of pressure testing cycles comprises pressurizing the frac iron configuration using a first number of pumps, and wherein one or more subsequent pressure testing cycles comprises pressurizing the frac iron configuration using a second number of pumps that is less than the first number of pumps.

Embodiment 4. The method of any of embodiments 1 to 3, wherein a given one of the plurality of pressure testing cycles comprises pressurizing the frac iron configuration using a first pump configuration including a set of pumps configured to operate at a first set of horsepower settings, and wherein one or more subsequent pressure testing cycles comprises pressurizing the frac iron configuration using the set of pumps configured to operate at a second set of horsepower settings that is different from the first set of horsepower settings.

Embodiment 5. The method of any of embodiments 1 to 4, further comprising: stopping, for the duration of the evaluation time period, further pressurization of the frac iron configuration once the predetermined evaluation pressure level within the frac iron configuration has been reached.

Embodiment 6. The method of any of embodiments 1 or 3 to 5, wherein detection of a leak based on the one or more measured pressures includes determining that the pressure loss in the frac iron configuration during the evaluation time period exceeds a threshold value.

Embodiment 7. The method of any of embodiments 1 to 6, further comprising: monitoring a bleed off pressure within the frac iron configuration over the evaluation time period as a slope of a pressure curve; and identifying, based on the slope of the pressure curve, at least one characteristic of the frac iron configuration causing the bleed off pressure.

Embodiment 8. The method of any of embodiments 1 to 7, wherein the plurality of pressure testing cycles incudes three or more pressure testing cycles, and wherein each of the pressure testing cycles is performed at a different predetermined evaluation pressure level.

Embodiment 9. The method of any of embodiments 1 to 8, further comprising: operating one or more valves to isolate at least one individual pump line or a main line of the frac iron configuration from being in fluid communication with any other of a set of individual pump lines included in the frac iron configuration and monitoring a measured pressure within the isolated individual pump line to determine whether a pressure loss in the isolated pump line indicates a detection of a leak with the isolated individual pump line.

Embodiment 10. The method of any of embodiments 1 to 9, further comprising: pressurizing the frac iron to a final and highest predetermined evaluation pressure level as part of a final pressure testing cycle; generating, by the processor, an output indication of a final leak test status for the frac iron configuration after completion of the final pressure testing cycle based on whether or not a leak was detected as a result of the final pressure testing cycle.

Embodiment 11. The method of any of embodiment 1 to 10, further comprising; displaying on a display device a visual indication of a detection of a leak in the frac iron configuration as a result of running one or more of the pressure testing cycles.

Embodiment 12. The method of any of embodiments 1 to 11, further comprising; determining that a leak has been detected in the frac iron configuration at the conclusion of any one of the plurality of pressure testing cycles, generating an output indicating that a leak have been detected and including a request for instructions regarding continuation of the pressure testing cycles; and receiving an input in response to the request for instructions, and either continuing with one or more pressure testing cycles or terminating the pressure testing of the frac iron configuration based on the input received.

Embodiment 13. A system comprising: a frac iron configuration comprising a network of devices forming one or more flow paths for containing and delivering a pressurized fluid to a wellbore; a plurality of pumps coupled to the frac iron configuration, the plurality of pumps configured to provide a pressurized fluid to the frac iron configuration; one or more sensors configured to monitor one or more fluid pressures within the frac iron configuration; and a controller configured to automatically control the operation of the plurality of pumps and to perform a plurality of pressure testing cycles on the frac iron configuration, wherein each of the pressure testing cycles comprises: pressurizing the frac iron configuration with a fluid to a predetermined evaluation pressure level within the frac iron configuration using one or more of the plurality of pumps configured in a predefined pump configuration, monitoring, based on output signal from the one or more sensors, one or more measured pressures levels within the frac iron configuration at one or more times during an evaluation time period beginning once the predetermined evaluation pressure level within the frac iron configuration has been reached, and determining, by the processor, whether a pressure loss in the frac iron configuration exceeds a maximum bleed off value based on the one or more measured pressures.

Embodiment 14. The system of embodiment 13, wherein a given one of the plurality of pressure testing cycles comprises the predefined pump configuration configured using a first number of the plurality of pumps, and wherein one or more subsequent pressure testing cycles comprises the predefined pump configuration configured using a second number of the plurality pumps that is less than the first number of pumps.

Embodiment 15. The system of embodiments 13 or 14, wherein a given one of the plurality of pressure testing cycles comprises the predefined pump configuration using a first set of horsepower settings for the plurality of pumps, and wherein one or more subsequent pressure testing cycles comprises the predefined pump configuration using a second set of horsepower setting for the plural of pumps that includes one or more different horsepower setting relative to the first set of horsepower settings.

Embodiment 16. The system of any of embodiments 13 to 15, wherein the plurality of pressure testing cycles incudes three or more pressure testing cycles, and wherein each of the pressure testing cycles is configured to performed at a different predetermined evaluation pressure level.

Embodiment 17. The system of any of embodiments 13 to 16, wherein a final pressure testing cycle of the plurality or pressure testing cycles is configured to pressurize of the frac iron configuration to a fluid pressure level in a range of 10,000 to 20,000 pound/square inch.

Embodiment 18. The system of any of embodiments 13 to 17, wherein the frac iron configuration comprises a plurality of individual pump lines coupled in fluid communication to one another through a manifold and to a main line that is deadheaded at a well head.

Embodiment 19. One or more non-transitory machine-readable storage medium having program code executable by a processor to cause the processor to: control performing automatically a plurality of pressure testing cycles on a frac iron configuration, each of the pressure testing cycles comprising: pressurizing the frac iron configuration with a fluid using a predefined pump configuration to generate a predetermined evaluation pressure level within the frac iron configuration, monitoring one or more measured pressures within the frac iron configuration at one or more times during an evaluation time period beginning once the predetermined evaluation pressure level within the frac iron configuration has been reached, and determining whether a pressure loss in the frac iron configuration indicates detection of a leak based on the one or more measured pressures.

Embodiment 20. The one or more storage medium of embodiment 19, wherein a given one of the plurality of pressure testing cycles comprises pressurizing the frac iron configuration using a first number of pumps, and wherein one or more subsequent pressure testing cycles comprises pressurizing the frac iron configuration using a second number of pumps that is less than the first number of pumps.

What is claimed is:

1. A method comprising:
performing automatically a plurality of pressure testing cycles on a frac iron configuration, each of the pressure testing cycles comprising:
pressurizing the frac iron configuration with a fluid using a predefined pump configuration to generate a predetermined evaluation pressure level within the frac iron configuration,
monitoring one or more measured pressures within the frac iron configuration at one or more times during an evaluation time period beginning once the predetermined evaluation pressure level within the frac iron configuration has been reached, including stopping, for the duration of the evaluation time period, further pressurization of the frac iron configuration, and
determining whether a pressure loss in the frac iron configuration indicates detection of a leak based on the one or more measured pressures.

2. The method of claim 1, further comprising:
generating an indication of a detection of a leak in the frac iron configuration in response to a determination that the pressure loss in the frac iron configuration exceeds a maximum bleed off threshold value during any of the pressure testing cycles.

3. The method of claim 1,
wherein a given one of the plurality of pressure testing cycles comprises pressurizing the frac iron configuration using a first number of pumps, and
wherein one or more subsequent pressure testing cycles comprises pressurizing the frac iron configuration using a second number of pumps that is less than the first number of pumps.

4. The method of claim 1,
wherein a given one of the plurality of pressure testing cycles comprises pressurizing the frac iron configuration using a first pump configuration including a set of pumps configured to operate at a first set of horsepower settings, and
wherein one or more subsequent pressure testing cycles comprises pressurizing the frac iron configuration using the set of pumps configured to operate at a second set of horsepower settings that is different from the first set of horsepower settings.

5. The method of claim 1, wherein detection of a leak based on the one or more measured pressures includes determining that the pressure loss in the frac iron configuration during the evaluation time period exceeds a threshold value.

6. The method of claim 1, further comprising:
operating one or more valves to isolate at least one individual pump line or a main line of the frac iron configuration from being in fluid communication with any other of a set of individual pump lines included in the frac iron configuration and
monitoring a measured pressure within the isolated individual pump line to determine whether a pressure loss in the isolated individual pump line indicates a detection of a leak with the isolated individual pump line.

7. The method of claim 1, further comprising:
pressurizing the frac iron to a final and highest predetermined evaluation pressure level as part of a final pressure testing cycle;
generating, by a processor, an output indication of a final leak test status for the frac iron configuration after completion of the final pressure testing cycle based on whether or not a leak was detected as a result of the final pressure testing cycle.

8. The method of claim 1, further comprising:
displaying on a display device a visual indication of a detection of a leak in the frac iron configuration as a result of running one or more of the pressure testing cycles.

9. The method of claim 1, further comprising;
determining that a leak has been detected in the frac iron configuration at the conclusion of any one of the plurality of pressure testing cycles,
generating an output indicating that a leak has been detected and including a request for instructions regarding continuation of the pressure testing cycles; and
receiving an input in response to the request for instructions, and either continuing with one or more pressure testing cycles or terminating the pressure testing of the frac iron configuration based on the input received.

10. A method comprising:
performing automatically a plurality of pressure testing cycles on a frac iron configuration, each of the pressure testing cycles comprising:
pressurizing the frac iron configuration with a fluid using a predefined pump configuration to generate a predetermined evaluation pressure level within the frac iron configuration,
monitoring one or more measured pressures within the frac iron configuration at one or more times during an evaluation time period beginning once the predetermined evaluation pressure level within the frac iron configuration has been reached, including monitoring a bleed off pressure within the frac iron configuration over the evaluation time period as a slope of a pressure curve; and
determining whether a pressure loss in the frac iron configuration indicates detection of a leak based on the one or more measured pressures, including identifying, based on the slope of the pressure curve, at least one characteristic of the frac iron configuration causing the bleed off pressure.

11. The method of claim 10, wherein the plurality of pressure testing cycles incudes three or more pressure testing cycles, and wherein each of the pressure testing cycles is performed at a different predetermined evaluation pressure level.

12. A system comprising:
a frac iron configuration comprising a network of devices forming one or more flow paths for containing and delivering a pressurized fluid to a wellbore;
a plurality of pumps coupled to the frac iron configuration, the plurality of pumps configured to provide a pressurized fluid to the frac iron configuration;
one or more sensors configured to monitor one or more fluid pressures within the frac iron configuration; and
a controller configured to automatically control the operation of the plurality of pumps and to perform a plurality of pressure testing cycles on the frac iron configuration, wherein each of the pressure testing cycles comprises:
pressurizing the frac iron configuration with a fluid to a predetermined evaluation pressure level within the frac iron configuration using one or more of the plurality of pumps configured in a predefined pump configuration,
monitoring, based on output signal from the one or more sensors, one or more measured pressures levels within the frac iron configuration at one or more times during an evaluation time period beginning once the predetermined evaluation pressure level within the frac iron configuration has been reached, including monitoring a bleed off pressure within the frac iron configuration over the evaluation time period as a slope of a pressure curve, and
determining whether a pressure loss in the frac iron configuration exceeds a maximum bleed off value based on the one or more measured pressures, including identifying, based on the slope of the pressure curve, at least one characteristic of the frac iron configuration causing the bleed off pressure.

13. The system of claim 12,
wherein a given one of the plurality of pressure testing cycles comprises the predefined pump configuration configured using a first number of the plurality of pumps, and
wherein one or more subsequent pressure testing cycles comprises the predefined pump configuration configured using a second number of the plurality pumps that is less than the first number of pumps.

14. The system of claim 12,
wherein a given one of the plurality of pressure testing cycles comprises the predefined pump configuration using a first set of horsepower settings for the plurality of pumps, and
wherein one or more subsequent pressure testing cycles comprises the predefined pump configuration using a second set of horsepower setting for the plural of pumps that includes one or more different horsepower settings relative to the first set of horsepower settings.

15. The system of claim 12, wherein the plurality of pressure testing cycles incudes three or more pressure testing cycles, and wherein each of the pressure testing cycles is configured to performed at a different predetermined evaluation pressure level.

16. The system of claim 12, wherein a final pressure testing cycle of the plurality of pressure testing cycles is configured to pressurize of the frac iron configuration to a fluid pressure level in a range of 10,000 to 20,000 pound/square inch.

17. The system of claim 12, wherein the frac iron configuration comprises a plurality of individual pump lines coupled in fluid communication to one another through a manifold and to a main line that is deadheaded at a well head.

18. One or more non-transitory machine-readable storage medium having program code executable by a processor to cause the processor to:
control performing automatically a plurality of pressure testing cycles on a frac iron configuration, each of the pressure testing cycles comprising:
pressurizing the frac iron configuration with a fluid using a predefined pump configuration to generate a predetermined evaluation pressure level within the frac iron configuration,
monitoring one or more measured pressures within the frac iron configuration at one or more times during an evaluation time period beginning once the predetermined evaluation pressure level within the frac iron configuration has been reached, including stopping, for the duration of the evaluation time period, further pressurization of the frac iron configuration, and determining whether a pressure loss in the frac iron configuration indicates detection of a leak based on the one or more measured pressures.

19. The one or more storage medium of claim 18, wherein a given one of the plurality of pressure testing cycles comprises pressurizing the frac iron configuration using a first number of pumps, and wherein one or more subsequent pressure testing cycles comprises pressurizing the frac iron configuration using a second number of pumps that is less than the first number of pumps.

20. A system comprising:

a frac iron configuration comprising a network of devices forming one or more flow paths for containing and delivering a pressurized fluid to a wellbore;

a plurality of pumps coupled to the frac iron configuration, the plurality of pumps configured to provide a pressurized fluid to the frac iron configuration;

one or more sensors configured to monitor one or more fluid pressures within the frac iron configuration; and a controller configured to automatically control the operation of the plurality of pumps and to perform a plurality of pressure testing cycles on the frac iron configuration, wherein each of the pressure testing cycles comprises:

pressurizing the frac iron configuration with a fluid to a predetermined evaluation pressure level within the frac iron configuration using one or more of the plurality of pumps configured in a predefined pump configuration, monitoring one or more measured pressures within the frac iron configuration at one or more times during an evaluation time period beginning once the predetermined evaluation pressure level within the frac iron configuration has been reached, including stopping, for the duration of the evaluation time period, further pressurization of the frac iron configuration, and determining whether a pressure loss in the frac iron configuration exceeds a maximum bleed off value based on the one or more measured pressures.

21. The system of claim 20, wherein each of the pressure testing cycles further comprises:

operating one or more valves to isolate at least one individual pump line or a main line of the frac iron configuration from being in fluid communication with any other of a set of individual pump lines included in the frac iron configuration, and monitoring a measured pressure within the isolated individual pump line to determine whether a pressure loss in the isolated individual pump line indicates a detection of a leak within the isolated individual pump line.

* * * * *